(12) United States Patent
Gladden et al.

(10) Patent No.: US 11,655,965 B2
(45) Date of Patent: May 23, 2023

(54) ADJUSTABLE-BEAM LUMINAIRE

(71) Applicant: Glint Photonics, Inc., Burlingame, CA (US)

(72) Inventors: Christopher Gladden, San Mateo, CA (US); Andrew Kim, San Jose, CA (US); Peter Kozodoy, Palo Alto, CA (US); Barbara Kruse, San Francisco, CA (US)

(73) Assignee: Glint Photonics, Inc., Burlingame, CA (US)

( * ) Notice: Subject to any disclaimer, the term of this patent is extended or adjusted under 35 U.S.C. 154(b) by 0 days.

(21) Appl. No.: 17/476,616

(22) Filed: Sep. 16, 2021

(65) Prior Publication Data

US 2022/0034483 A1 Feb. 3, 2022

Related U.S. Application Data

(63) Continuation of application No. 17/065,357, filed on Oct. 7, 2020, now Pat. No. 11,131,441, which is a
(Continued)

(51) Int. Cl.
| | |
|---|---|
| *F21V 14/06* | (2006.01) |
| *G02B 19/00* | (2006.01) |
| *F21V 8/00* | (2006.01) |
| *F21V 5/00* | (2018.01) |
| *F21V 7/00* | (2006.01) |
| *F21V 17/02* | (2006.01) |
| *F21K 9/61* | (2016.01) |
| *G02B 26/08* | (2006.01) |

(Continued)

(52) U.S. Cl.
CPC ............... *F21V 14/06* (2013.01); *F21K 9/61* (2016.08); *F21V 5/007* (2013.01); *F21V 7/0008* (2013.01); *F21V 17/02* (2013.01); *G02B 6/005* (2013.01); *G02B 6/0036* (2013.01); *G02B 6/0055* (2013.01); *G02B 19/0028* (2013.01); *G02B 19/0066* (2013.01); *G02B 26/0875* (2013.01); *F21Y 2105/00* (2013.01); *F21Y 2115/10* (2016.08); *G02B 3/0006* (2013.01); *G02B 26/08* (2013.01)

(58) Field of Classification Search
CPC ........ F21V 14/06; F21V 5/007; F21V 7/0008; F21V 17/02; G02B 26/0875
See application file for complete search history.

(56) References Cited

U.S. PATENT DOCUMENTS

| | | | | |
|---|---|---|---|---|
| 2007/0291813 A1* | 12/2007 | Hu | ..................... | G02B 19/0028 |
| | | | | 372/107 |
| 2011/0058353 A1* | 3/2011 | Yang | ........................ | F21S 4/28 |
| | | | | 362/231 |
| 2014/0192558 A1* | 7/2014 | Dau | ........................ | G02B 6/00 |
| | | | | 362/613 |

FOREIGN PATENT DOCUMENTS

WO    WO-2009034511 A2 *  3/2009  .............. F21L 4/005

\* cited by examiner

*Primary Examiner* — Evan P Dzierzynski
(74) *Attorney, Agent, or Firm* — David J. Thibodeau, Jr.; VLP Law Group, LLP

(57) ABSTRACT

A luminaire for providing configurable static lighting or dynamically-adjustable lighting. The luminaire uses an array of focusing elements that act on light provided via a corresponding array of sources or via an edge-lit lightguide. Designs are provided for adjusting the number of distinct beams produced by the luminaire, as well as the angular width, angular profile, and pointing angle of the beams. Designs are also provided for systems utilizing the adjustable luminaires in various applications.

17 Claims, 18 Drawing Sheets

Related U.S. Application Data continuation of application No. 16/353,647, filed on Mar. 14, 2019, now Pat. No. 10,837,624, which is a continuation of application No. 15/715,017, filed on Sep. 25, 2017, now abandoned.

(60) Provisional application No. 62/457,819, filed on Feb. 11, 2017, provisional application No. 62/452,381, filed on Jan. 31, 2017, provisional application No. 62/399,911, filed on Sep. 26, 2016.

(51) Int. Cl.
*G02B 3/00* (2006.01)
*F21Y 105/00* (2016.01)
*F21Y 115/10* (2016.01)

ADJUSTABLE-BEAM LUMINAIRE

CROSS-REFERENCE TO RELATED APPLICATIONS

This application is a continuation of co-pending U.S. application Ser. No. 17/065,357 filed on Oct. 7, 2020 (the entire contents of which are hereby incorporated by reference), which is a continuation of U.S. application Ser. No. 16/353,647, filed on Mar. 14, 2019, which is a continuation of U.S. application Ser. No. 15/715,017, filed on Sep. 25, 2017, which claimed priority to the following US provisional applications, which are incorporated herein by reference: Ser. No. 62/399,911, filed Sep. 26, 2016, by Christopher Gladden et al.; Ser. No. 62/452,381, filed Jan. 31, 2017, by Barbara Kruse et al.; Ser. No. 62/457,819, filed Feb. 11, 2017, by Peter Kozodoy.

GOVERNMENT LICENSE RIGHTS

This invention was made with Government support under contract DE-AR0000332 awarded by the Advanced Research Projects Agency-Energy (ARPA-E), a division of the Department of Energy. The Government has certain rights in the invention.

FIELD OF THE INVENTION

The present invention relates to optics, specifically to optical systems for controlling beam properties in illumination.

BACKGROUND

Directional lighting is important in many contexts, for example in providing illumination for task areas in a workplace, for highlighting objects in a retail space or an artistic exhibition, for illuminating walkways and roadways outdoors, and many more applications. Commonly-used light fixtures that provide the option to adjust lighting directionality typically include an illumination "head" that can be swiveled to point in a desired direction. Multiple heads are often included in a single light bank or in a configurable system such as a track lighting system. Adjustments to the angular spread of the output beam from each head is typically achieved by installing a bulb with the desired output beam width.

A planar adjustable luminaire design of prior art is disclosed in Joseph Ford PCT/US2014/057873 "Microstructured Waveguide Illuminator" and William M. Mellette, Glenn M. Schuster, and Joseph E. Ford, "Planar waveguide LED illuminator with controlled directionality and divergence," *Optics Express* vol. 22 No. S3, 2014 (Mellette et al). This design offers the potential advantage of a compact low-profile form factor with wide adjustability. The luminaire uses an edge-illuminated lightguide with periodic extraction features that is mated to an array of refractive lenses or reflectors ("focusing elements"). By adjusting the relative location of the extraction features and the focusing elements, the direction of the beam can be steered and the angular width of the output beam can be adjusted. FIG. 1 provides an exploded view of such a design. It includes a lightguide 10 that is illuminated by a light source 11, in this example composed of light emitting diodes (LEDs) 20 and associated coupler optics 18. The lightguide 10 may be of a continuous-mode type as shown in FIG. 1 or a stepped-mode type. In either case, the lightguide includes a periodic array of extraction features 12. These features reflect or scatter light so that it is no longer trapped in guided modes of the lightguide and instead exits the lightguide to interact with the array of focusing refractive lenses 24. The extraction features shown in FIG. 1 are reflective and are preferably shaped as prisms to deflect guided light toward the focusing elements, but may also be shaped as cones, hemispheres, or other shapes. They lie approximately in the focal plane of the focusing elements so that light scattered by the extraction elements is substantially collimated by the focusing elements. The refractive lens array 24 is composed of individual refractive lenses 25 all in a single plane. The lenses 25 substantially collimate the light before it exits the luminaire into the environment.

FIG. 2 is a cross-section view of a portion of an adjustable luminaire of prior art that uses reflective focusing elements. The array of reflectors 14 is composed of dielectric-filled reflective lenses 15 with reflective coating 19. One extraction feature 12 is associated with each reflective lens. Light from the light source 11 is guided in the lightguide 10. Some of the light is deflected by extraction features 12 to exit the guide 10 and enter the reflector array 14. These light rays 13 reflect off the reflective coating 19 becoming partially collimated, and then transit through the lightguide 10 before exiting the luminaire as output light beam 16. Note that light rays emanating from the light source 11 and traveling within the guide 10 are not depicted in FIG. 2 in the interest of visual clarity; only example light rays 13 deflected by one of the extraction elements 12 are shown.

FIG. 3 is a ray trace diagram showing an example four-lens refractive focusing element array in the luminaire of prior art. The figure demonstrates control over the characteristics of the output beam of the luminaire. Each individual lens 25 serves to substantially collimate the light reflected or scattered by the corresponding extraction feature 12 so that it is emitted into the environment as a directional beam 16 of narrow angular width. Control over the directionality of the individual beams 16 is achieved by varying the relative location of the extraction feature 12 and the lens 25. This can be achieved by translating the array of lenses 24 relative to the extraction features 12 in the lightguide. As the location of the extraction feature 12 moves from the center of the lens 25 (as in FIG. 3a) to the edge (as in FIG. 3b), the output beam 16 is steered from perpendicular to the plane of the lightguide to a high angle.

If all lenses in the array 24 are identical in optical formula and bear the same orientation relative to their corresponding extraction features 12, then all the output beams 16 will point in the same direction. In that case, all the focusing elements are contributing to a narrow aggregate beam pointed in a single direction. Alternatively, if the lenses in the array 24 are twisted relative to the array of extraction features 12, as shown in FIG. 3c, then each of the output beams 16 will point in a somewhat different direction. In that case, the aggregate output beam 17 is the sum of the differently-pointed beams and results in a wider aggregate beam. Therefore, independent control over beam pointing and aggregate beam width is provided by translating and twisting the relative position of the focusing element array and the extraction element array. The same mechanism applies in the case of both refractive and reflective focusing elements.

The prior art describes several implementations of this design, including the use of motorized actuators and a control system to provide remote control over the output characteristics of the adjustable luminaire. The prior art also describes the use of a switchable material in the lightguide that provides for pixelated control over the location and presence of the extraction features. The prior art describes a mechanism for controlling this whereby a layer of liquid crystal material with electrically-adjustable refractive index is placed on the face of the lightguide. In its low-refractive-index state, this material acts as cladding to keep light confined within the lightguide. Pixelated electrodes allow it to be locally switched to a high-refractive-index state, allowing light to locally interact with a tilted mirror array and be ejected from the guide. This provides a mechanism for local control over the location of the extraction feature. The design can be implemented with a stationary lens array to provide a steerable luminaire design with no moving parts.

Mellette et al also discusses using an array of point-like LED sources in place of the lightguide, but teaches that the idea is impractical in its various embodiments. The idea is described as having a thicker form factor than a system comprising a lightguide, categorically not allowing for the use of reflective lenses, and incapable of matching the efficiency and total brightness of a system comprising a lightguide. Mellette et al specify the use of the Cree XM-L2 LED, which is a large LED with a tall integrated silicone dome and their drawings depict domed LEDs.

While the prior art described above provides for major advantages compared to conventional steerable luminaires, it still suffers from various limitations affecting implementation for specific applications. These include (i) beam widths that are wider than is desirable for some applications, (ii) provision of only a single adjustable beam output per luminaire, (iii) restriction to a square or nearly-square form factor in order to maintain a full range of beam width control via twisting, and (iv) performs with extremely low efficiency.

SUMMARY OF THE INVENTION

This filing describes a number of inventions for the realization and optimization of adjustable luminaires.

In accordance with a preferred embodiment, a luminaire is described in which the direction, shape, and spread of the emitted light can be adjusted or configured.

A further understanding of the nature and advantages of the present invention may be realized by reference to the remaining portions of the specification and the drawings.

DESCRIPTION OF THE SPECIFIC EMBODIMENTS

Part 1: Light Sources

1a: Edge-Lit with Remote Downconversion Materials

A variety of light sources may be used in the edge-lit luminaire device. Among other sources, these include light-emitting diode (LED) and laser diode (LD) sources. These light sources are attractive as they are small and can operate at high optical efficiency. In order to provide full-spectrum white light, these sources are often utilized with one or more downconversion materials such as phosphors that convert a portion of the light to lower-energy longer-wavelength light. In some devices, the downconversion medium is placed directly on the LED or LD device to form a white-light-emitting component. Placing the downconversion materials away from the LED source improves efficiency by reducing the amount of light scattered back into the LED source. Also, some downconversion materials do not operate well at the elevated temperatures present at the LED or LD device, and instead are best utilized at a remote distance from the devices. In any optical system where light traverses the system multiple times, such as in an edge-lit luminaire, or where phosphor-coated light sources are placed near each other, such as in a closely spaced array of light sources, blue light emitted by the light sources encounters downconversion materials several times and the average color of the light shifts towards the color of the downconversion material emission and away from the desirable Planckian black body locus of color; this becomes a practical problem because the color shift depends highly on the design of a given system and light sources of the necessary color to counteract the color shift are not readily and economically available.

Figure 4:
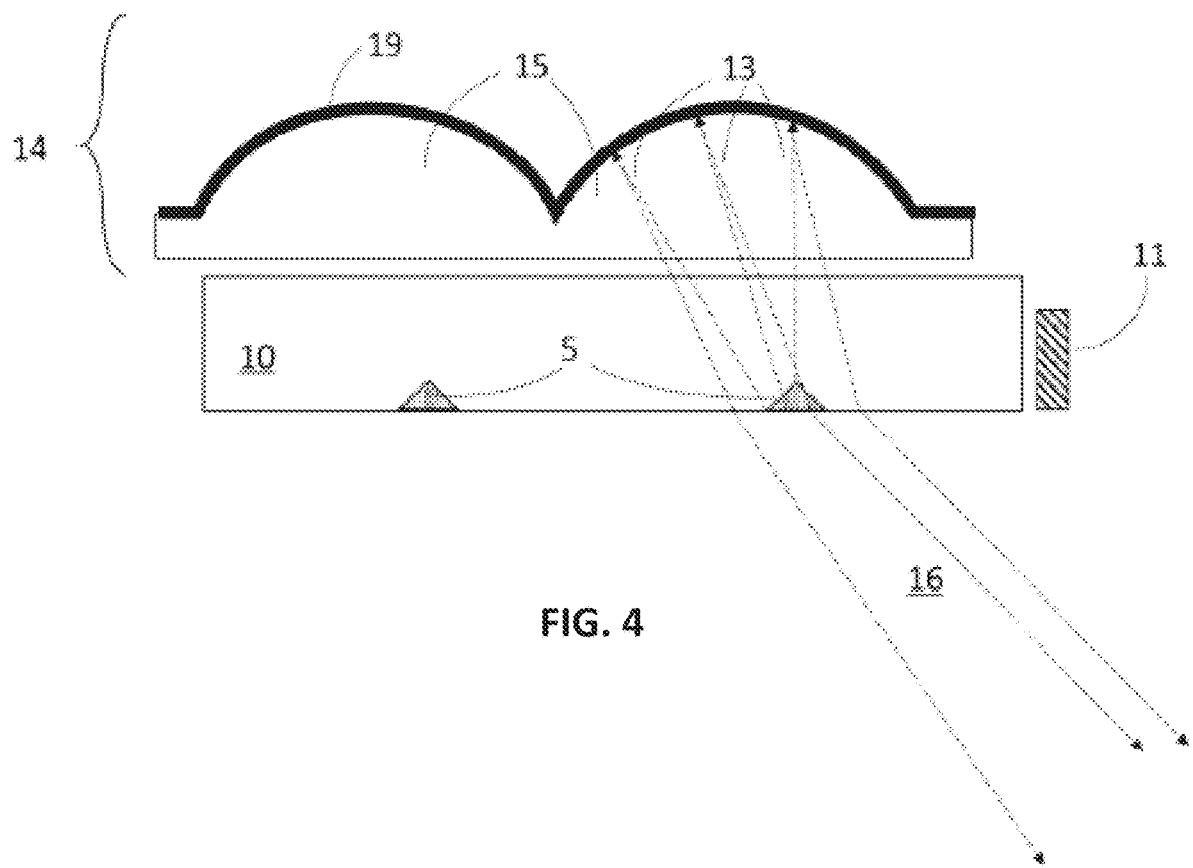
FIG. 4 provides a cross-section view of a section of an adjustable luminaire with downconversion materials located at the extraction features.

An improved luminaire design is shown in FIG. 4. It has downconversion materials 5 present at the extraction locations, replacing or augmenting the use of downconversion materials in the light source 11. This implementation of the downconversion material remote from the source 11 permits the use of higher performance downconversion materials than otherwise possible. The downconversion material at the extraction location absorbs some of the light incident upon it, and then emits light at a lower energy. It may also act to scatter or reflect some of the incident light without absorption. The downconversion material is optimized so that the combined scattered and downconverted light achieves a desired output spectrum. It may be a mix of different compounds designed to tailor this spectrum. In addition, the downconversion material may be shaped into a shape such as a cone or a prism in order to optimize the capture and directional scatter and re-emission properties within the guide. Finally, the downconversion material may be implemented as a coating applied to a specular or scattering extraction feature like those of prior art.

1b: Direct-Lit

Figure 5:
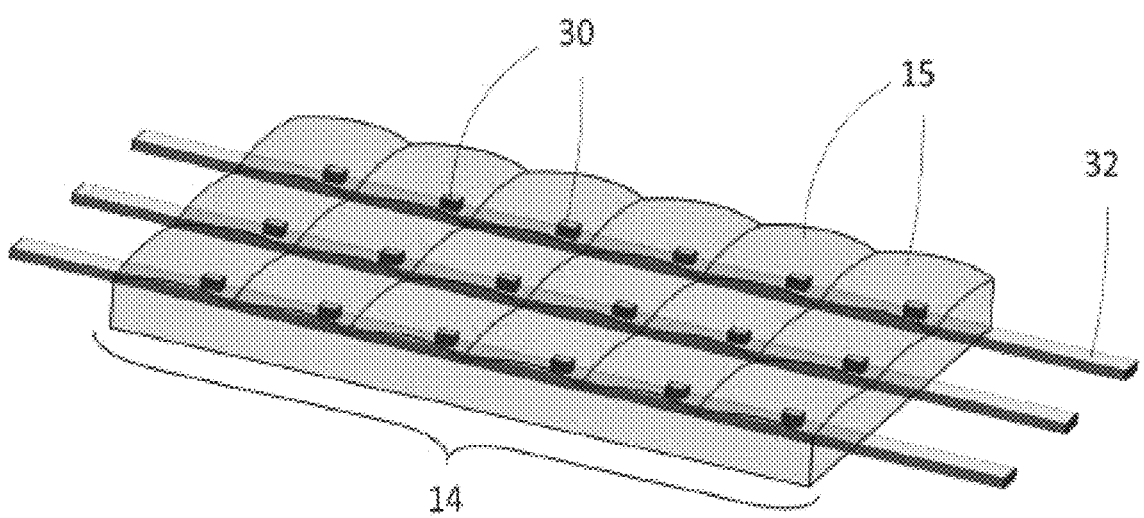
FIG. 5 provides a perspective view of an adjustable luminaire with direct light source illumination.

FIG. 5 depicts a luminaire design that includes an array of light sources 30, each coupled to a reflective lens 15. The light sources 30 may be of any type but are preferably LEDs or LDs for compactness and efficiency. Vertical-cavity surface-emitting laser diodes (VCSELs) are another option for the light source. In all cases, the light sources are connected in a network electrically and by heat spreading elements. The electrical connections bring electrical power to the light sources to drive them, and the heat spreading elements are used to route heat away from the sources to reduce operating temperature. The electrical connections and heat spreading elements may be optionally combined into a single structure or even combined into a single element. This is shown in the example system of FIG. 5, where a strip of metal-core printed circuit board (MCPCB) 32 connects individual light sources 30 in a line, providing both electrical connections and a heat spreading element.

It is advantageous to design the system so that the emitting area of the light source 30 is much smaller than the area of the reflective lens 15, enabling the focusing element to produce a beam of a narrow angular width. For example, the diameter of the focusing element may be approximately 5 to 20 times the diameter of the light emitting area of the source. The light emitting area and the thickness of the light source 30 can also be significantly minimized by selecting light source 30 that do not have any significant encapsulating clear dome; for example, a small and flat non-domed LED or chip-scale packaged LED, as illustrated as the light source 30 in FIG. 5.

This design may be implemented with either refractive or reflective focusing elements. When implemented with a reflector array 14, as shown, it is also advantageous to minimize the area of the electrical connections and heat-spreading elements, as these will shadow the reflected light and reduce system optical efficiency. In one preferred embodiment, the luminaire comprises MCPCB 32 and small and flat LEDs as the light source 30 to minimize shadowing, as shown in FIG. 5.

The direct-lit design uses the arrayed light sources 30 in place of the lightguide and extraction features used in the edge-lit designs. It shares the same adjustable functionality, however. Aggregate beam steering is achieved by translating the array of focusing elements relative to the array of light sources, and aggregate beam broadening can be achieved by twisting the array of focusing elements relative to the array of light sources.

An advantage of the direct-lit design is that it can be implemented with high optical efficiency in a small form factor. The edge-lit design can require an array of a certain length in order to achieve a target optical efficiency, because of the requirement to extract light from a lightguide. Also, the edge-lit design requires a certain thickness of lightguide 10 to maintain a flat shape when fabricated of plastic materials, to have sufficient mechanical toughness against breakage when fabricated of any transparent materials, and to provide for sufficient in-coupling of light from light source 11; for example, this thickness can be 1.5 mm to 5 mm and the required thickness increases as the size of the lightguide 10 increases. In contrast, the direct-lit design can be produced with any number of light sources in an array, including even only a single light source. The direct-lit design can also be produced as thin or thinner than an equivalent edge-lit design, where small and flat LEDs typically under 0.7 mm in thickness are used as light source 30 with MCPCB 32 typically 1.0 to 2.0 mm in thickness, while having superior flatness and resistance to breakage over an edge-lit design.

The remainder of this filing provides further improvements to the optical and system design of adjustable directional luminaires. These are generally described in implementations that use the light-guide design, however it should be understood that in most cases they can be equivalently realized using a direct-lit design.

1c: Geometry

Figure 6:
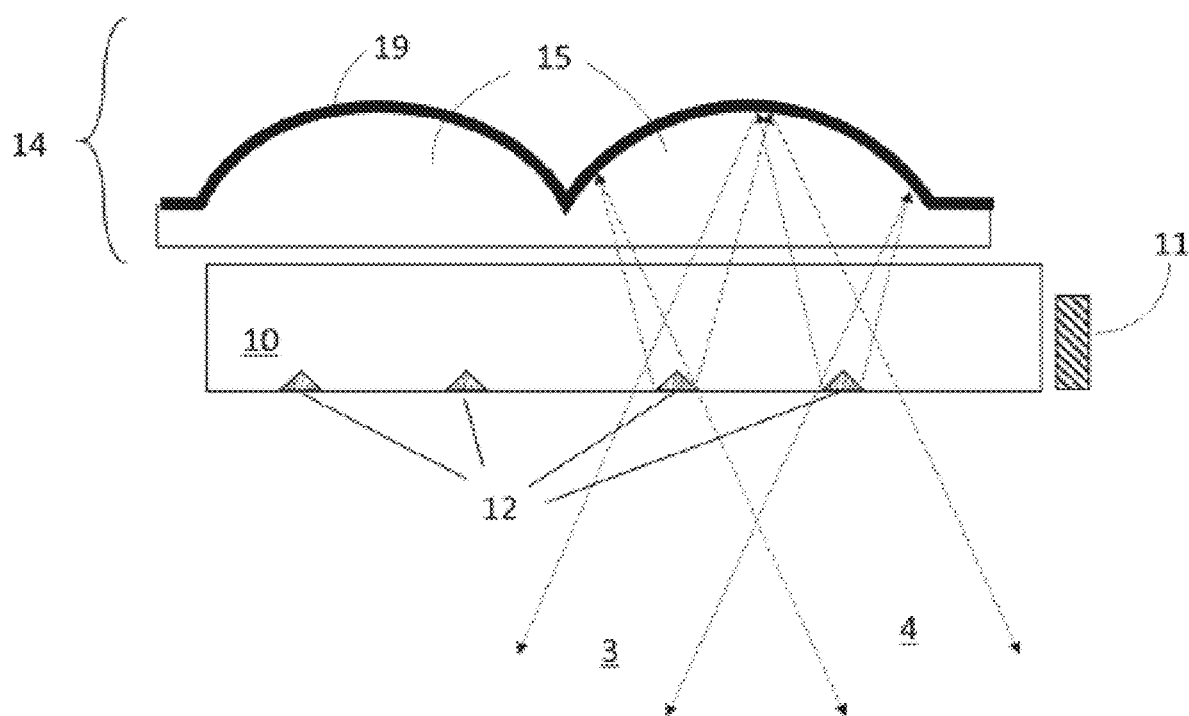
FIG. 6 provides a cross-section view of a section of an adjustable luminaire having multiple extraction features associated with each focusing element.

The prior art considers only a single array of extraction features associated with the array of focusing elements. An improved invention allows for multiple arrays of extraction features in a single lightguide and associated with a single array of focusing elements. These multiple arrays of extraction features may all feature the same periodicity as the focusing element array, so that each focusing element is associated with multiple extraction features and therefore outputs multiple output beams at multiple different steering angles. Translation of the focusing element array relative to the lightguide thereby steers all the multiple different output beams simultaneously. FIG. 6 shows a system with two extraction features 12 associated with each reflective lens 15. These two features produce two distinct output beams, 3 and 4. This invention may also be realized in a direct-lit luminaire by placing multiple light emitters within the focal plane of each focusing element.

Figure 7A:
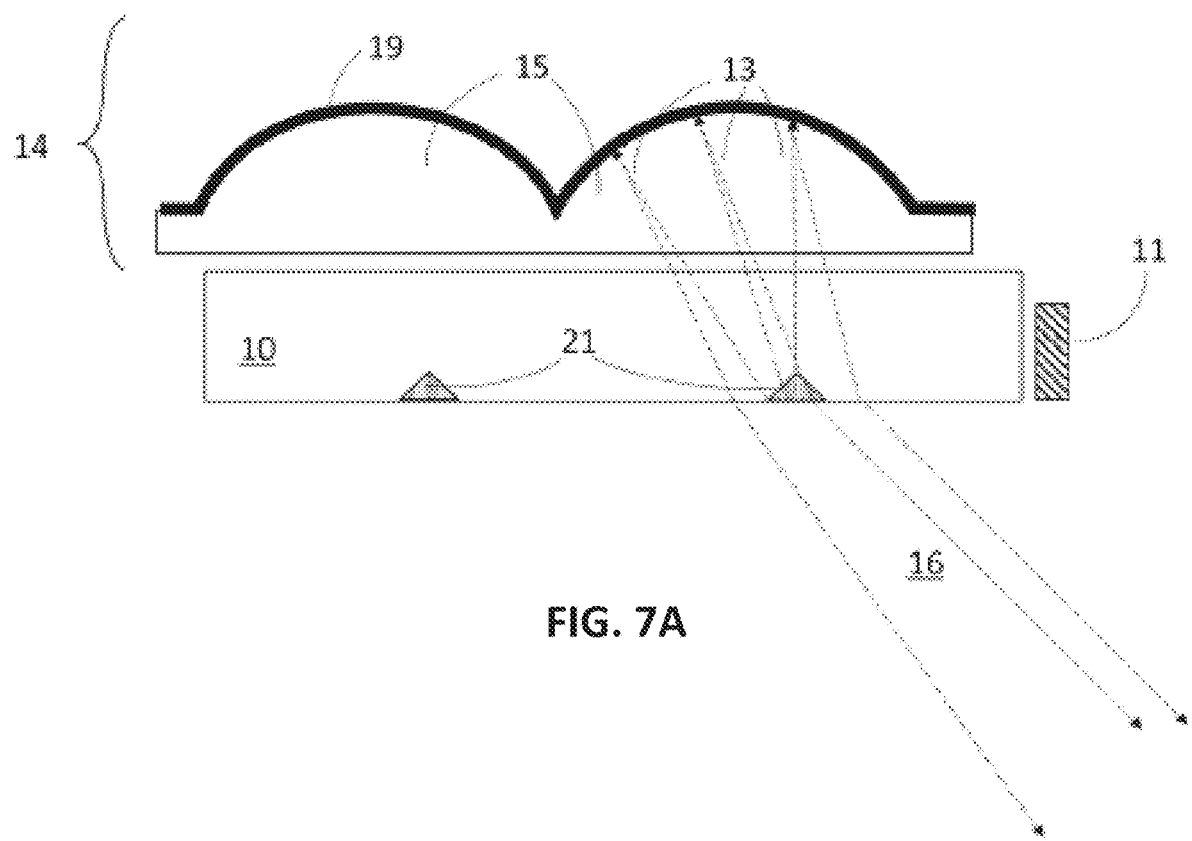
FIG. 7a and FIG. 7b provide two orthogonal cross-section views of an adjustable luminaire having elongated extraction features and producing a beam that is wider in one axis than another.
Figure 7B:
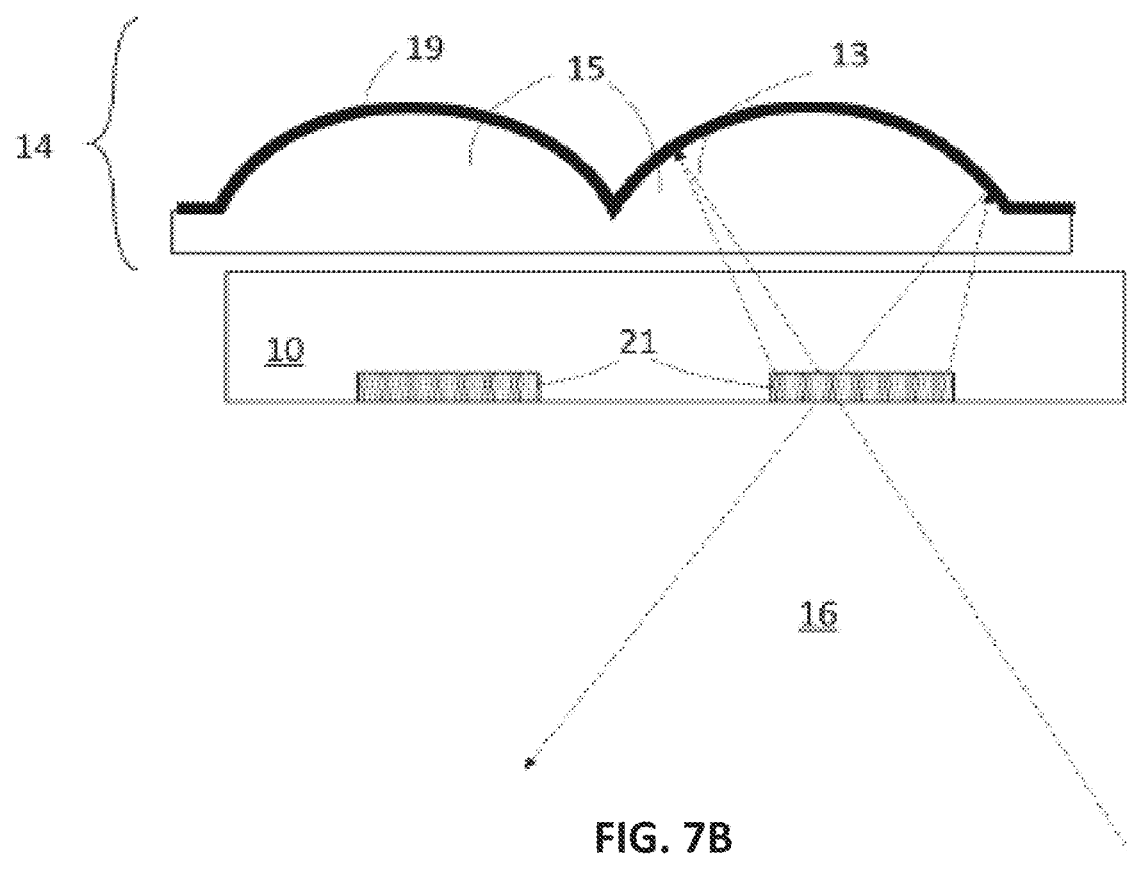

The prior art considers only extraction features that are of approximately unity aspect ratio in the plane of the light guide, such as a prism that occupies a square area in the plane of the light guide. An improved invention allows for the use of extraction features that are elongated in one axis. This produces an output beam that is asymmetric, having a broad beam spread in one axis and a narrow beam spread in the perpendicular axis. This is shown in FIGS. 7a and 7b, which depict a luminaire in two orthogonal cross-section views. The extraction features 21 are narrower in the cross section of FIG. 7a and wider in the cross-section of FIG. 7b, being elongated in that axis. This produces an output beam 16 that is narrow in one axis (as shown in FIG. 7a) and wide in the second axis (as shown in FIG. 7b). The elongation may optionally be extended to the entire width of the focusing element. This invention may also be realized in a direct-lit luminaire by utilizing elongated light sources or multiple light sources arrayed in an elongated pattern.

The prior art considers only regular arrays of extraction features and focusing elements, all of equal size and sharing precisely the same periodicity. An improved invention allows for the use of extraction features and focusing elements of varying periodicity and size in order to create a desired beam profile.

For example, a ceiling-mounted luminaire of prior art will produce a symmetric beam that results in an elongated projected spot of uneven brightness when projected onto a vertical wall. An improved luminaire designed for such an application can counteract this by tailoring the size and relative position of the extraction features and focusing elements within the array to produce an asymmetric beam. Each extraction feature produces an output beam, and the aggregate output beam is the sum of these individual beams. The arrays may be designed with non-matching periodicity, so that beams of different pointing angles are produced by different focusing elements. The intensity of the aggregate beam across these different beam angles may be tailored by adjusting the number of focusing elements outputting at each angle in order to provide the desired asymmetric beam profile. The asymmetric beam may be steered and broadened using the same mechanisms described above.

Figure 8A:
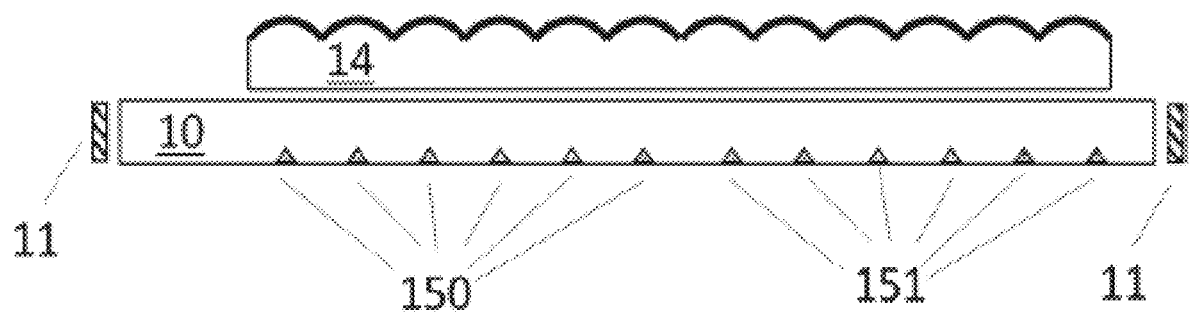
FIG. 8a provides a cross-section view of a luminaire having extraction features and focusing elements that do not all share the same periodicity and that produces an asymmetric output beam.
Figure 8B:
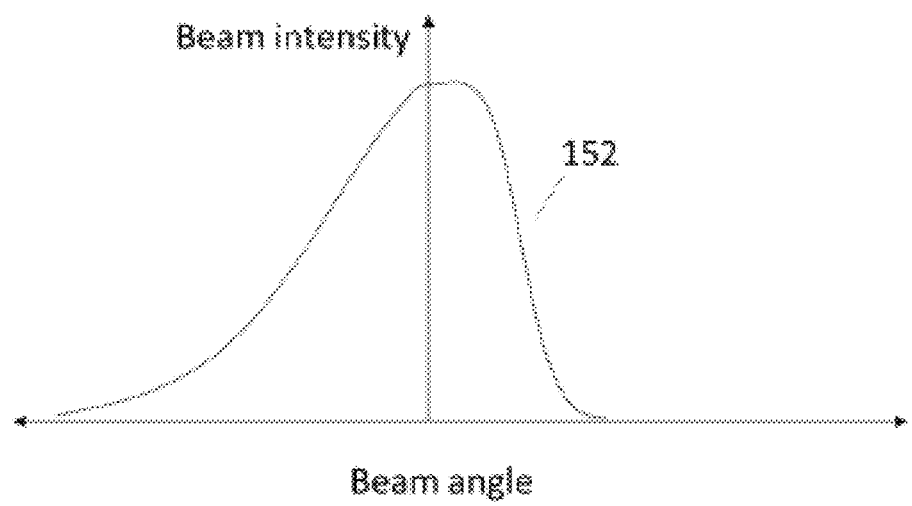
FIG. 8b provides an example asymmetric beam intensity profile.

An example luminaire is shown in FIG. 8a. Extraction features 150 share the periodicity of the reflector array 14 and are centered with respect to their associated focusing elements, while extraction features 151 do not share the periodicity of the focusing element array and are spread so that each extraction feature 151 is differently aligned to its associated focusing element, in this case ranging from centered to offset at one edge. The resulting output beam profile 152, as shown in FIG. 8b, has a central lobe formed primarily by the extraction features 150 and is extended asymmetrically in one direction as a result of the extraction features 151.

Figure 9:
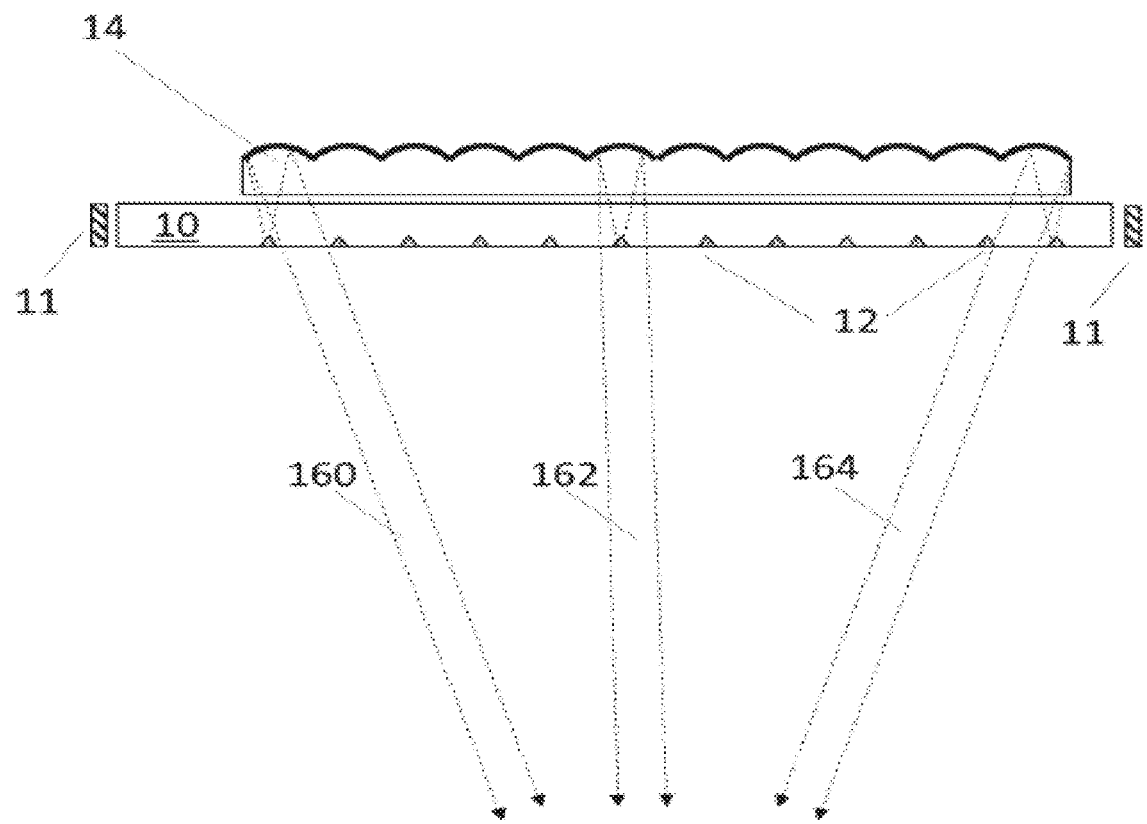
FIG. 9 provides a cross-section view of an extended luminaire having extraction features and focusing elements that do not all share the same periodicity and that produces converging output beams.

Another use of this invention is to provide beam pointing that varies in a deterministic way with position in the focusing element array. For example, a luminaire that provides a steerable spotlight in a linear form factor with a high aspect ratio may be desired. Such a luminaire could have an example length of between 12 and 36 inches. In order to provide a small spotlight from such an extended source, it may be desirable to have the beams point in different directions along the length of the array, so that they tend to converge toward a spot at a typical use distance from the luminaire. This can be achieved, for example, by designing the spacing of the extraction feature array to be slightly larger than that of a reflective focusing element array along the length of the luminaire. This is shown in FIG. 9, which depicts a luminaire in which the periodicity of the extraction features 12 is slightly larger than that of the reflector array 14. As a result, the beams 160 and 164 from the ends of the array tend to converge toward the center, combining with beam 162 to form a narrow spot at a desired distance from the luminaire.

Note that these inventions may also be realized in a direct-lit embodiment by varying the size and periodicity of the light source array and focusing element array.

Part 2: Focusing Elements

2a: Catadioptric Optics

Figure 1:
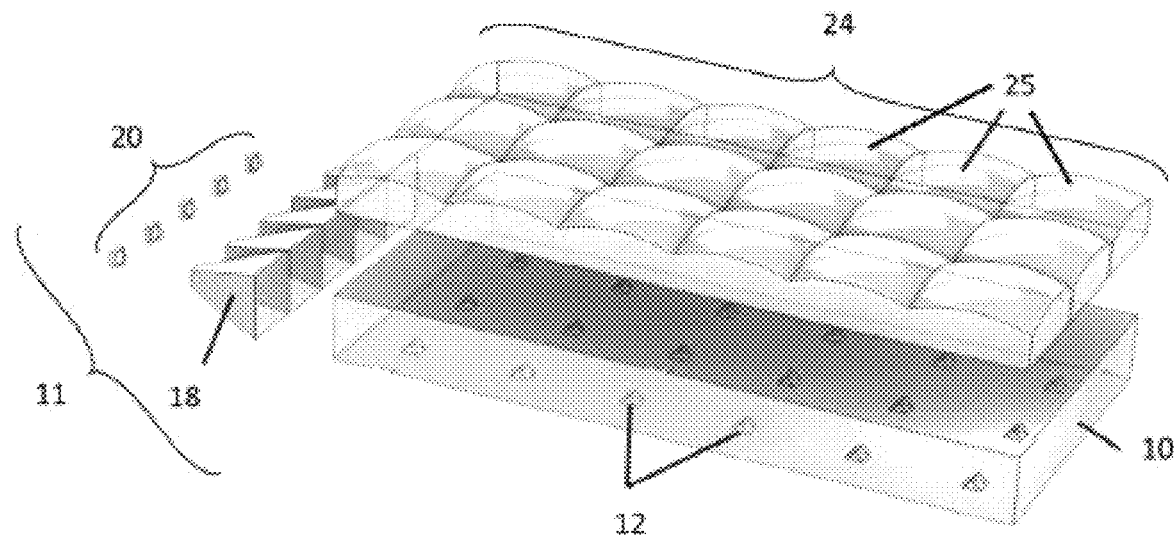
FIG. 1 provides an exploded view of an adjustable luminaire of prior art.
Figure 2:
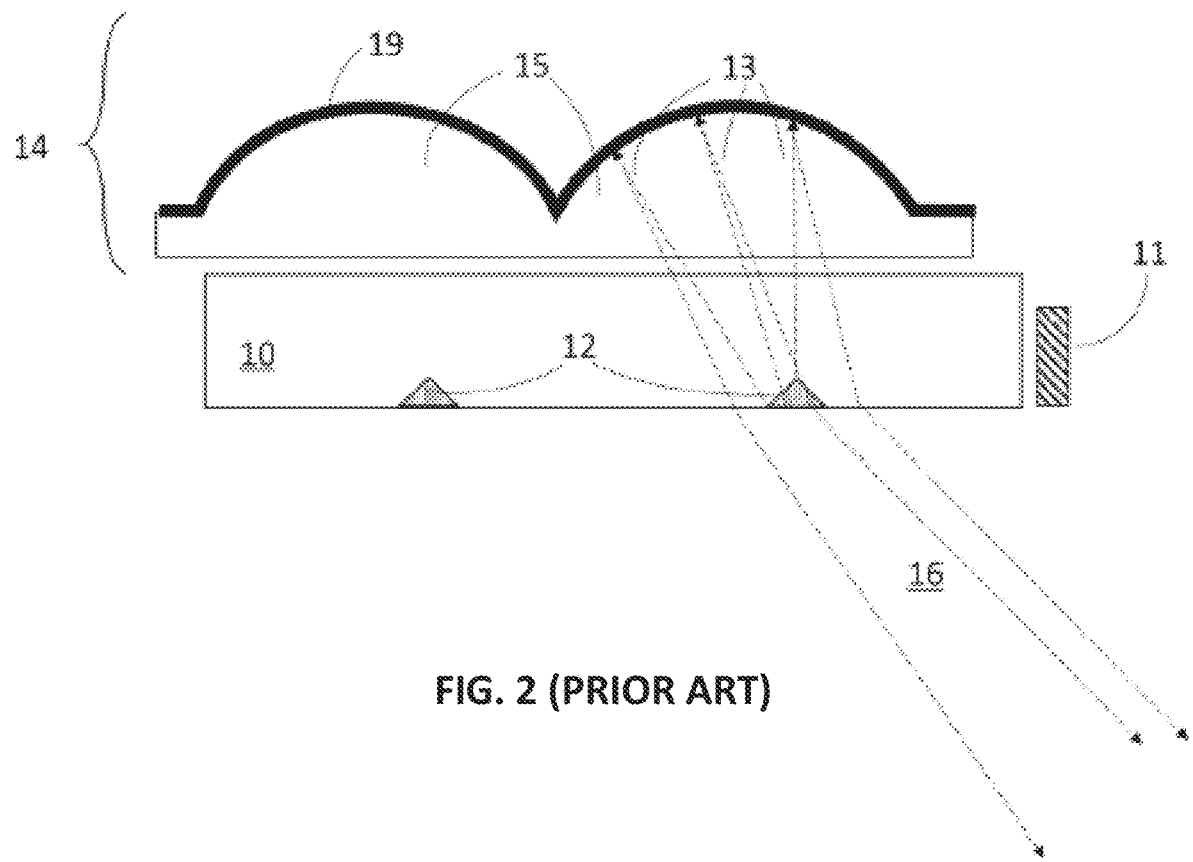
FIG. 2 provides a cross-section view of a section of an adjustable luminaire of prior art.
Figure 3A:
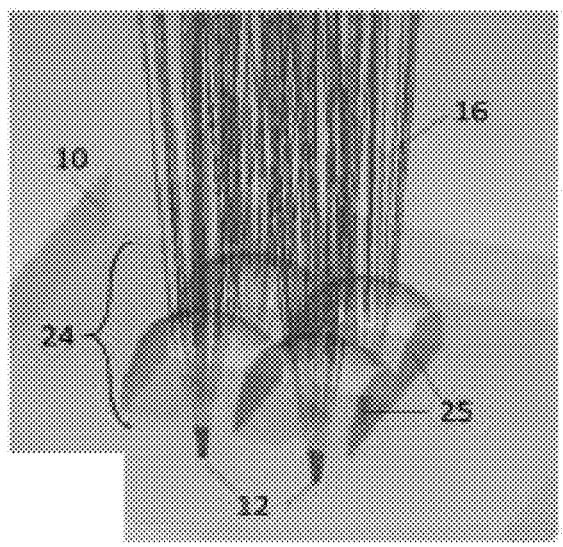
FIG. 3 (a) provides a ray trace of a section of an adjustable luminaire of prior art with extraction features centered under the focusing elements and ray trace depiction of output light beams.
FIG. 3(b) provides a view in which the extraction elements are translated to the edge of the focusing elements.
FIG. 3(c) provides a view in which the array of extraction elements is twisted in relation to the array of focusing elements.
Figure 3B:
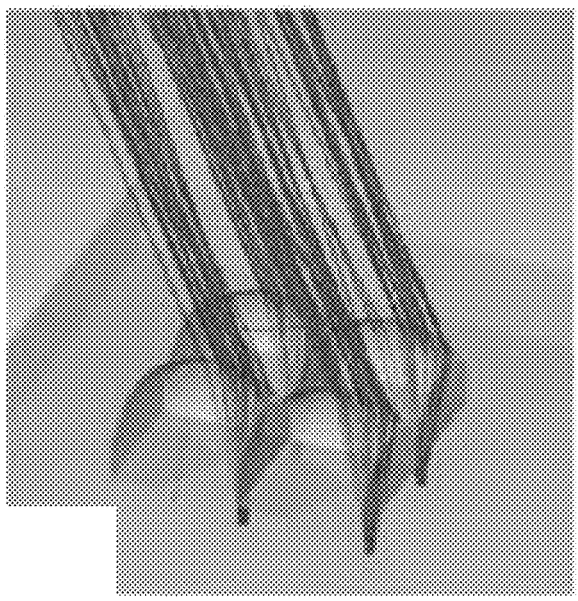
Figure 3C:
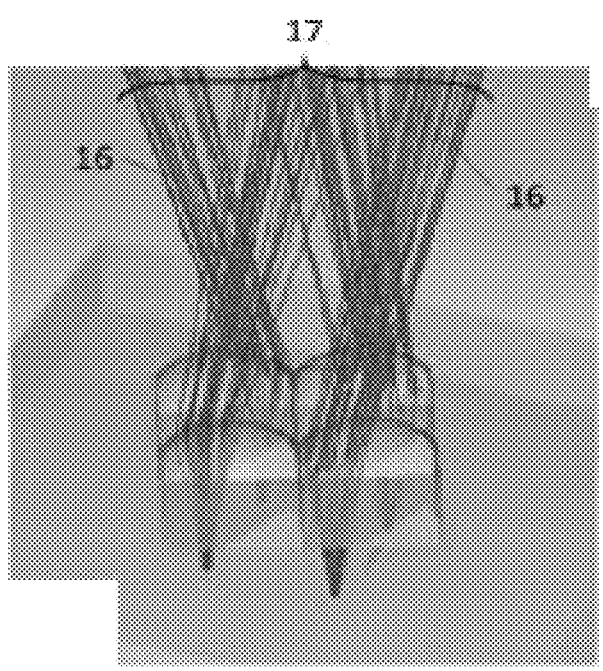
Figure 10:
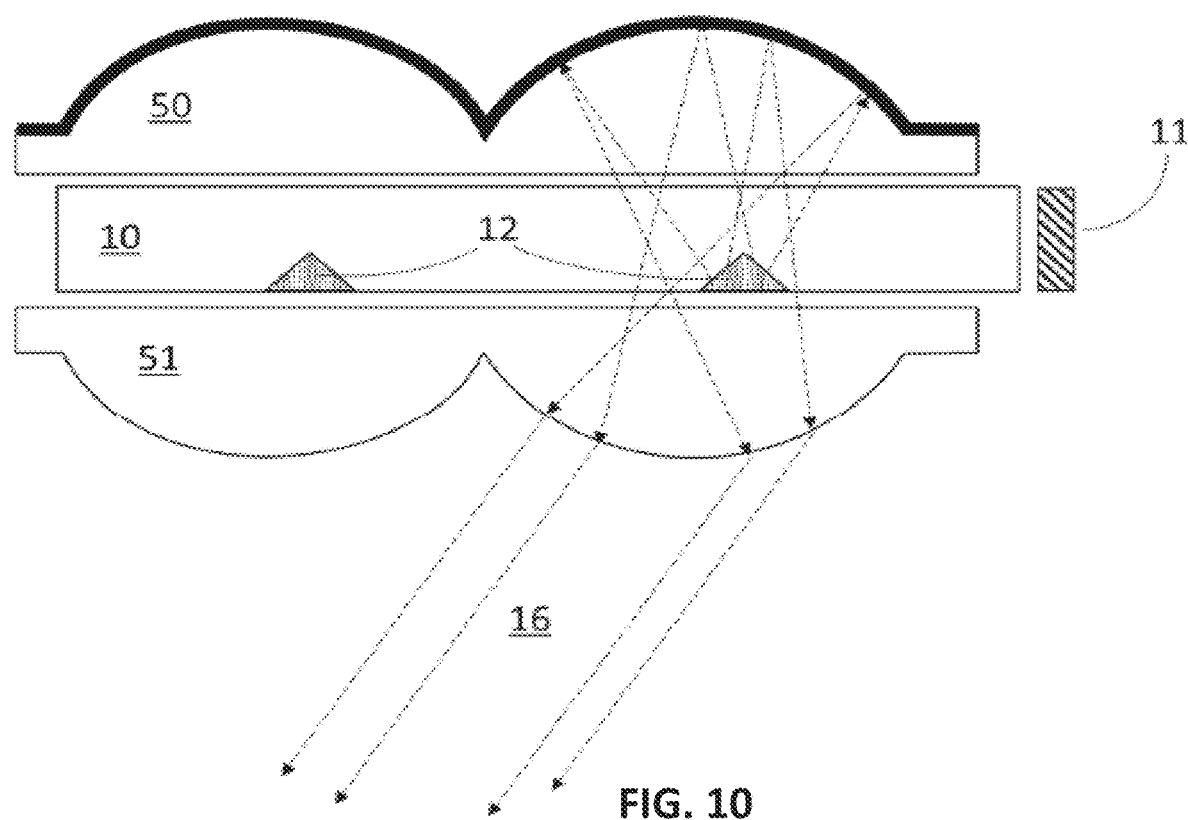
FIG. 10 provides a cross-section view of a section of an adjustable luminaire with catadioptric focusing elements.

The prior art steerable luminaire describes the use of single refractive lens array (as in FIG. 3) or reflector array (as in FIG. 2). FIG. 10 describes a new option: the use of catadioptric optics that combine both a reflector array 50 and a refractive lens array 51. One reflector and one refractive lens are associated with each extraction element 12 (or with each light source if used in a direct-lit configuration, not shown). The extraction features 12 sit at the approximate focal plane of the combined focusing elements made of the reflector and refractive lens arrays. The reflector array 50 and refractive lens array 51 are kept in permanent alignment to one another, and move relative to the lightguide extraction features 12 in order to provide beam steering and beam broadening. Combining reflective and refractive elements permits a more narrow output beam to be maintained over a wider range of output angles than can be achieved with only a single type of focusing element. This is because the combined catadioptric system maintains a more flat focal field than can be achieved with a single focusing device. While FIG. 10 describes an edge-lit embodiment of this invention, it can also be realized in a direct-lit configuration by utilizing an array of light sources rather than an array of extraction features in an edge-lit lightguide.

2b: Focusing Element Design

The prior art designs envisioned focusing elements that are rotationally symmetric, therefore providing a symmetric output beam. An additional option is to use focusing elements that have toroidal surfaces characterized by a different radius of curvature and different aspheric terms in the two primary axes. This results in oval-shaped output beams, which can be advantageous in various situations. In an extreme case of this design, the focusing elements may be made cylindrical so that they provide focusing in one axis only, leaving the other axis unfocused. Examples of applications that can benefit from oval-shaped output beams include lighting of linear spaces such as hallways, and lighting of vertical surfaces (such as wall-mounted art), where an oval beam shape can be used to counter the tendency of a symmetric beam to become stretched when projected onto the vertical surface.

Part 3: Beam Control

3a: z-Axis Beam Spread Control

Figure 11:
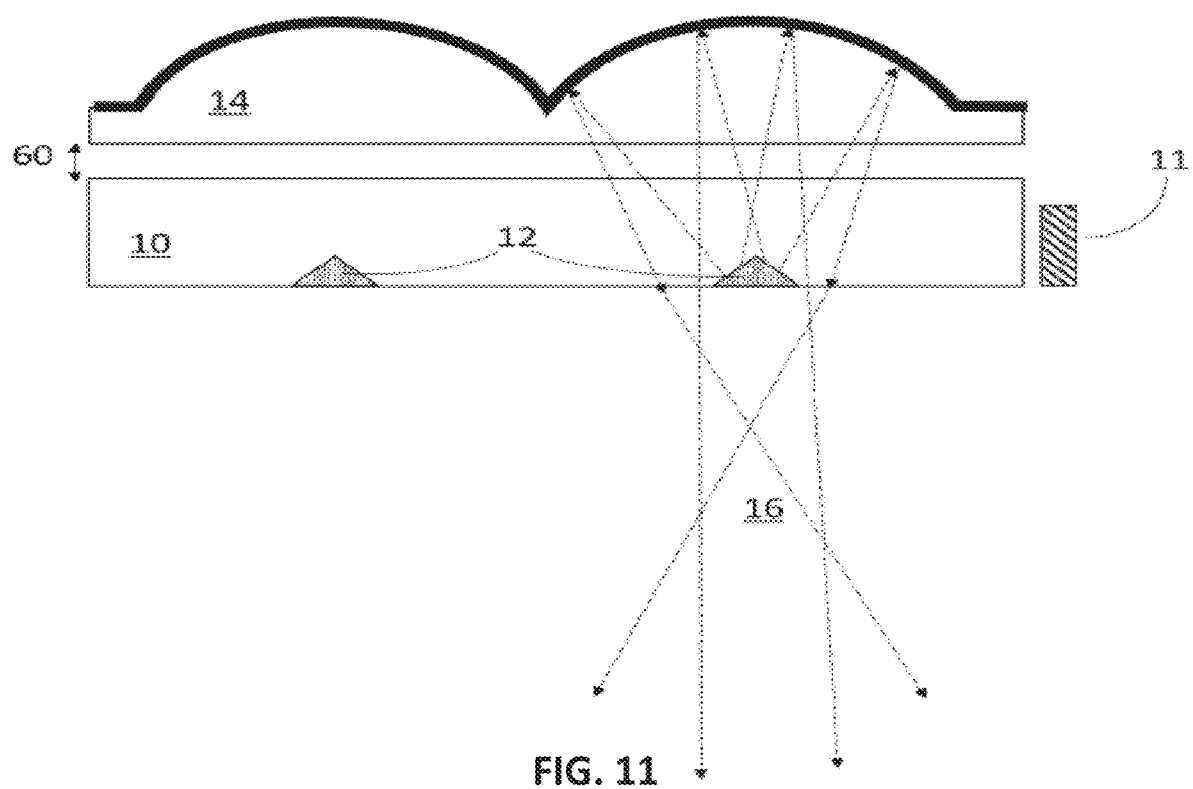
FIG. 11 provides a cross-section view of a section of an adjustable luminaire with z-axis adjustment of output beam width.

The prior art described the use of twisting actuation to vary the angular divergence of the aggregate output beam. We describe here an alternative mechanism to control output beam divergence. FIG. 11 shows a system using a reflector array 14 and an edge-lit lightguide 10 with extraction features 12. The gap 60 between the reflector array 14 and the lightguide 10 may be dynamically varied. Doing so causes the extraction features 12 to move in and out of the focus of the reflector elements in 14, causing the output beam 16 to narrow and widen. Thus, beam width modulation is provided by translating the reflector array 14 relative to the lightguide 10 in the direction perpendicular to the lightguide 10 (the "z-axis"). Further, this translational control of beam width may be combined with in-plane twisting actuation if desired. While FIG. 11 describes an edge-lit embodiment of this invention, it can also be realized in a direct-lit configuration by utilizing an array of light sources rather than an array of extraction features in an edge-lit lightguide.

3b: Combined Directional and Omnidirectional Lighting

It may be desired to combine adjustable narrow-beam directional light with an amount of broad-angle general lighting. Various mechanisms are presented here for achieving this end.

One mechanism is to introduce scattering elements randomly distributed in the lightguide so that a fraction of the guided light is scattered out and forms a broad-angle aggregate beam. The scattering elements may also be placed in the focusing element array if desired.

Figure 12:
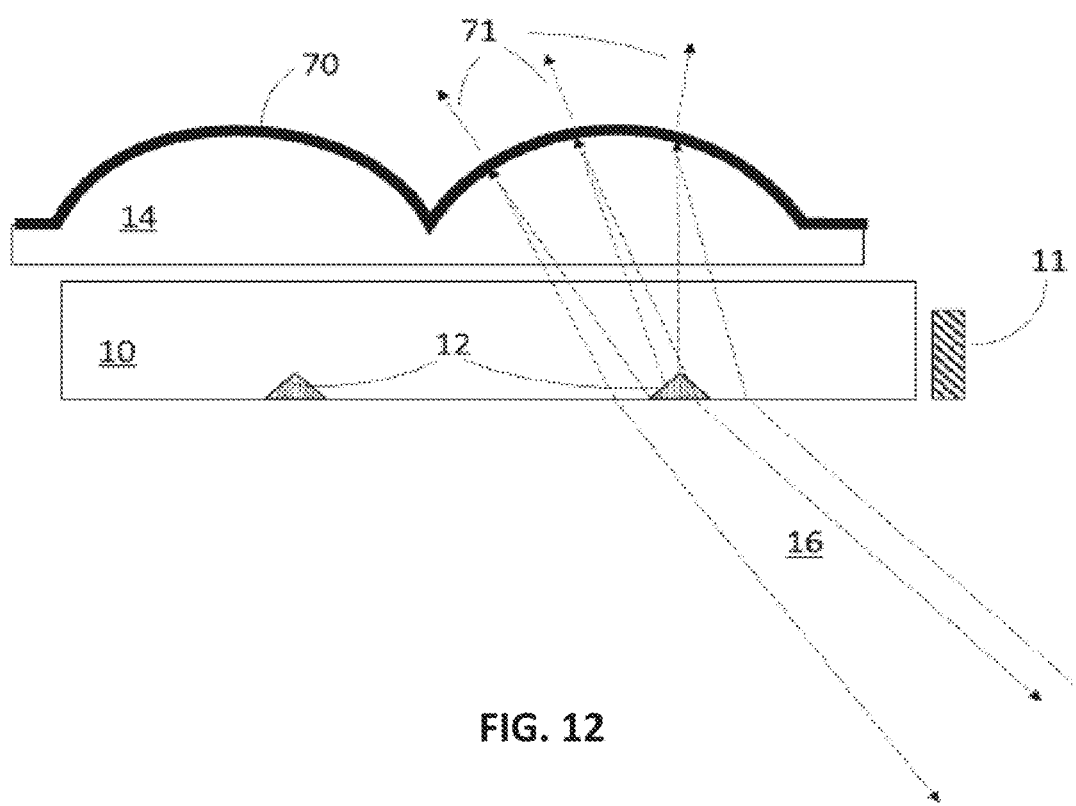
FIG. 12 provides a cross-section view of a section of an adjustable luminaire with partially transmissive reflector coating.

Another mechanism is shown in FIG. 12. This design uses a reflector array 14 with a reflective coating 70 that is partially transparent and partially reflective. In this system, the portion of the light that is transmitted through the reflective coating 70 exits in a broad upward beam 71 forming a broad-beam uplight, while the portion of the beam that is reflected forms an adjustable directional downlight beam 16. While FIG. 12 describes an edge-lit embodiment of this invention, it can also be realized in a direct-lit configuration by utilizing an array of light sources rather than an array of extraction features in an edge-lit lightguide.

Part 4: Multiple Segment Design

Figure 13:
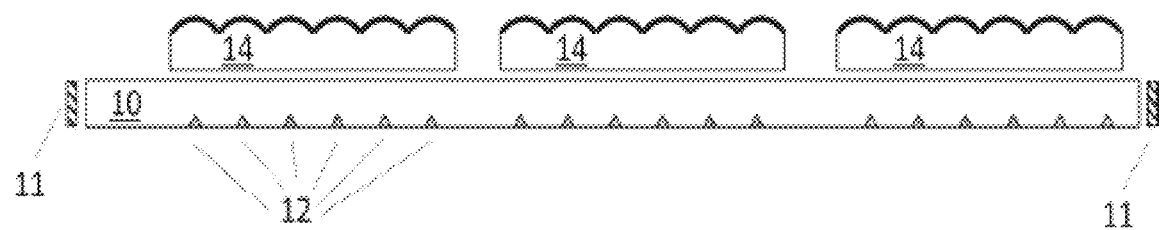
FIG. 13 provides a cross-section view of an adjustable luminaire with multiple independently-controllable output beams.

The prior art contemplated luminaires with a single adjustable aggregate output beam. FIG. 13 depicts a new system design, which can include multiple independently-adjustable reflector arrays 14. The reflector arrays are utilized with a rectangular lightguide 10 that has extraction features 12 in multiple arrays corresponding to each of the reflector arrays 14. The light guide is edge-lit by light sources 11 that may be present on one or more sides of the lightguide, with the unlit sides optionally coated by a reflective material to increase optical efficiency. Each of the reflector arrays 14 produces a separate aggregate output beam that can be independently pointed and adjusted via in-plane translation and twist, and/or z-axis translation. The system is unique and novel in providing a number of independently-adjustable directional lights from a common light source and a single fixture. For an edge-lit system, the longer optical path length that may be used with multiple independent arrays increases the light extraction efficiency of the system.

We note that, if desired, similar systems featuring multiple independently-adjustable output beams can be achieved using refractive lens arrays instead of reflector arrays, and/or utilizing a direct-lit geometry in place of the edge-lit system shown in FIG. 13.

Figure 14A:
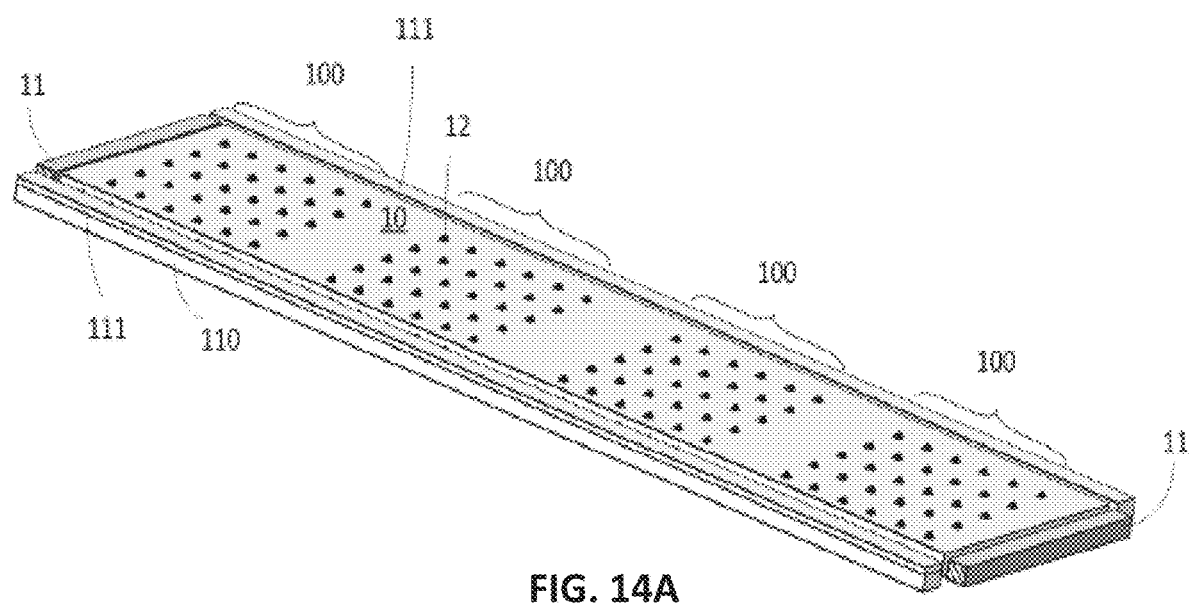
FIG. 14a provides a perspective view of a modular adjustable luminaire with multiple attachment locations.
Figure 14B:
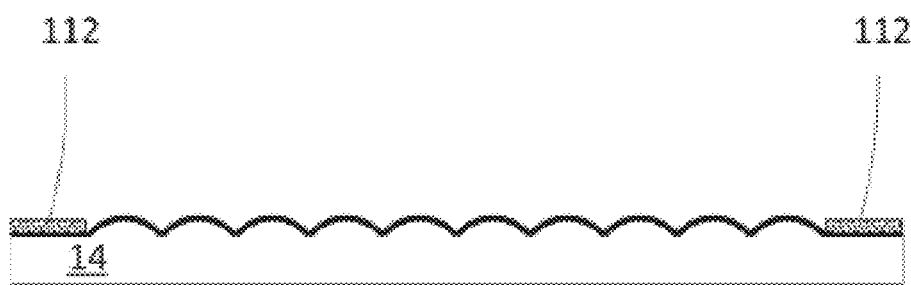
FIG. 14b provides a cross-section view of an attachment for providing steerable directional lighting.
Figure 14C:
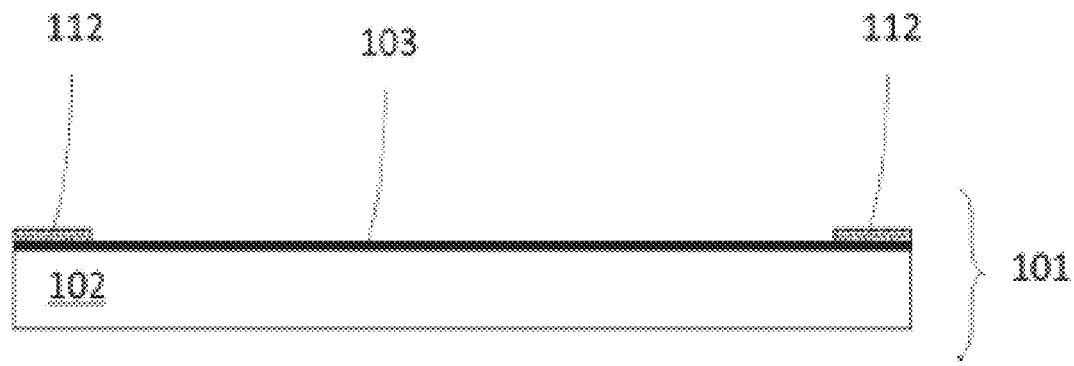
FIG. 14c provides a cross-section view of an attachment for providing broad downlighting.
Figure 14D:
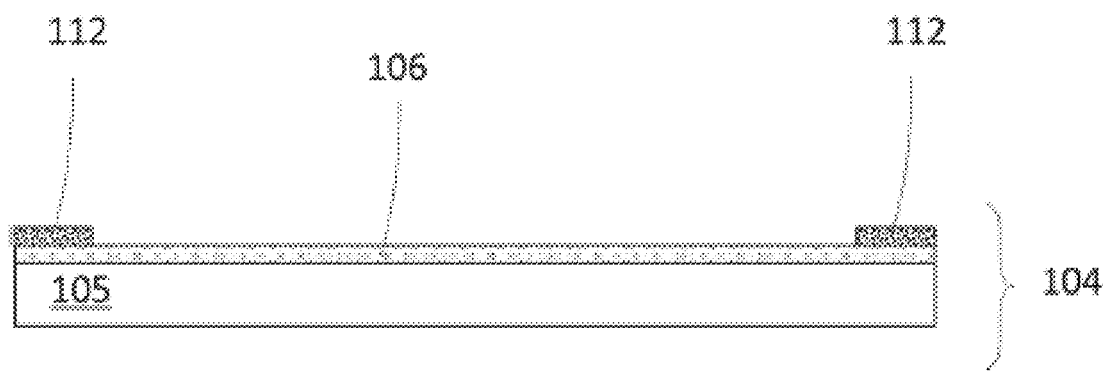
FIG. 14d provides a cross-section view of an attachment for providing broad uplighting.

FIG. 14a depicts a modular system in which a lightguide 10 is provided with multiple arrays of extraction features 12, each such array providing an attachment location 100 for a modular output device. Each such location 100 can be utilized to form a directional beam or a broad area beam by the choice of attachment placed adjacent to the light guide. The attachments are shown in FIGS. 14b, 14c, and 14d. They may be attached adjacent to the light guide by any number of means. One example attachment mechanism is the use of magnetic attraction to hold the attachments in place, while still permitting them to be translated and twisted for output beam control. This magnetic attachment scheme uses magnetic materials 111 and 112 embedded in the frame 110 around the lightguide 10 and in the attachment parts respectively. At least one of the magnetic materials 111 and 112 is a permanent magnet, while the other may be a ferromagnetic material. The mounting of the attachments maintains a gap between the lightguide and the attachment. This gap may be filled with air or another low-refractive-index material to serve as cladding for the light guide.

If the reflector array 14 shown in FIG. 14b is placed adjacent to the light guide in location 100, it will provide an adjustable directional light output as described earlier. The attachment can be positioned by sliding the attachment against the magnetic material 111 in the frame, allowing the reflector array 14 to be translated and twisted relative to the extraction features 12.

FIG. 14c shows another attachment option: a broad-area reflector 101. This reflector is formed by an optional transparent layer 102 and a reflective layer 103. The reflective layer 103 may be specularly reflective or scattering in nature. In either case, placement of the broad-area reflector 101 in the attachment location 100 results in a broad downward beam output.

FIG. 14d shows another attachment option: an uplight attachment 104. The uplight attachment consists of an optional transparent layer 105 and an optional diffusive layer 106 that diffuses light. Placement of the uplight attachment 104 in the attachment location 100 results in a broad-beam uplight output. Such output can also be achieved by leaving the attachment location 100 without an attachment.

Another option (not shown) is an attachment providing a combination of uplight and downlight by utilizing a partially transmissive and partially reflecting coating.

The designs provided here result in a configurable luminaire that can provide multiple adjustable directional beams as well as broad-beam uplight and downlight. The segments can be reconfigured by the user to provide whatever combination of these three is desired, and to readjust the combination over time as desired. While FIG. 14 describes an edge-lit embodiment of this invention, it can also be realized in a direct-lit configuration by utilizing an array of light sources rather than an array of extraction features in an edge-lit lightguide.

Figure 15:
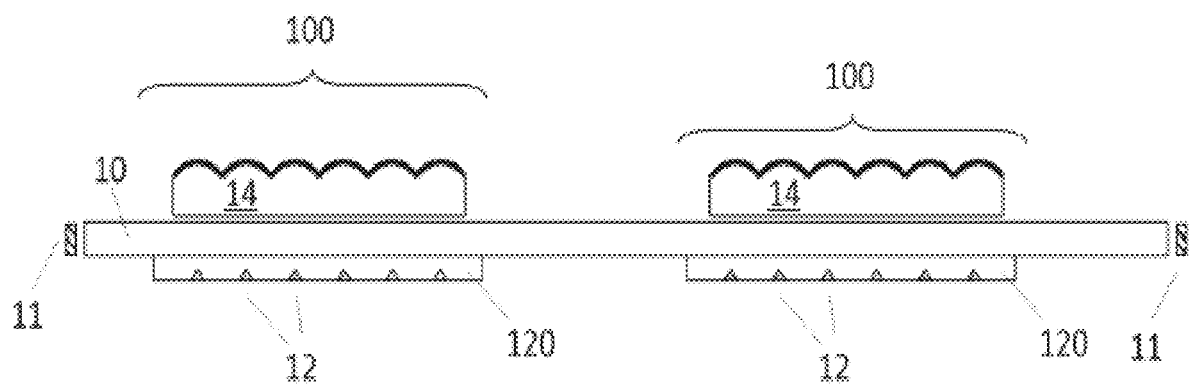
FIG. 15 provides a cross-section view of a modular adjustable luminaire with variable attachment locations.

A further modification to this system design is shown in FIG. 15. In this case, the lightguide 10 is provided without extraction features. The arrays of extraction features 12 are instead prepared in a separate extraction array material 120. Each extraction array material 120 consists of a transparent layer of rigid or flexible material with a single array of extraction features 12 embedded within it. The extraction array material 120 can be placed on the lightguide 10 wherever is desired in order to produce an attachment location 100 for light output. In each such location, a reflector array 14 may be placed (as shown), or other attachments may be used. Multiple extraction array materials 120 can be utilized with a single long lightguide, allowing directional output beams to be placed wherever desired along a track. In order to ensure effective light extraction, the extraction array materials 120 must be mated to the lightguide 10 with no air gap, so that light transits from the lightguide 10 into the extraction array material 120. To facilitate this, the extraction array materials may incorporate a transparent adhesive layer, or may be made of materials that "cling" effectively to the lightguide 10.

Part 5: Actuation

Adjustment of the beam properties is achieved by altering the relative placement and orientation of the focusing element array and the lightguide, with its array of extraction features. Many mechanical configurations are possible for manual or motorized adjustment of the relative location for these two pieces. The magnetic mounting scheme shown in FIG. 14 is one such system. The focusing element array may be moved relative to the light guide by hand, either by sliding it directly or with any sort of handle attachments. For example, a handle attachment protruding from the focusing element array could be combined with a pivot to provide a joystick-type actuation mechanism.

Figure 16:
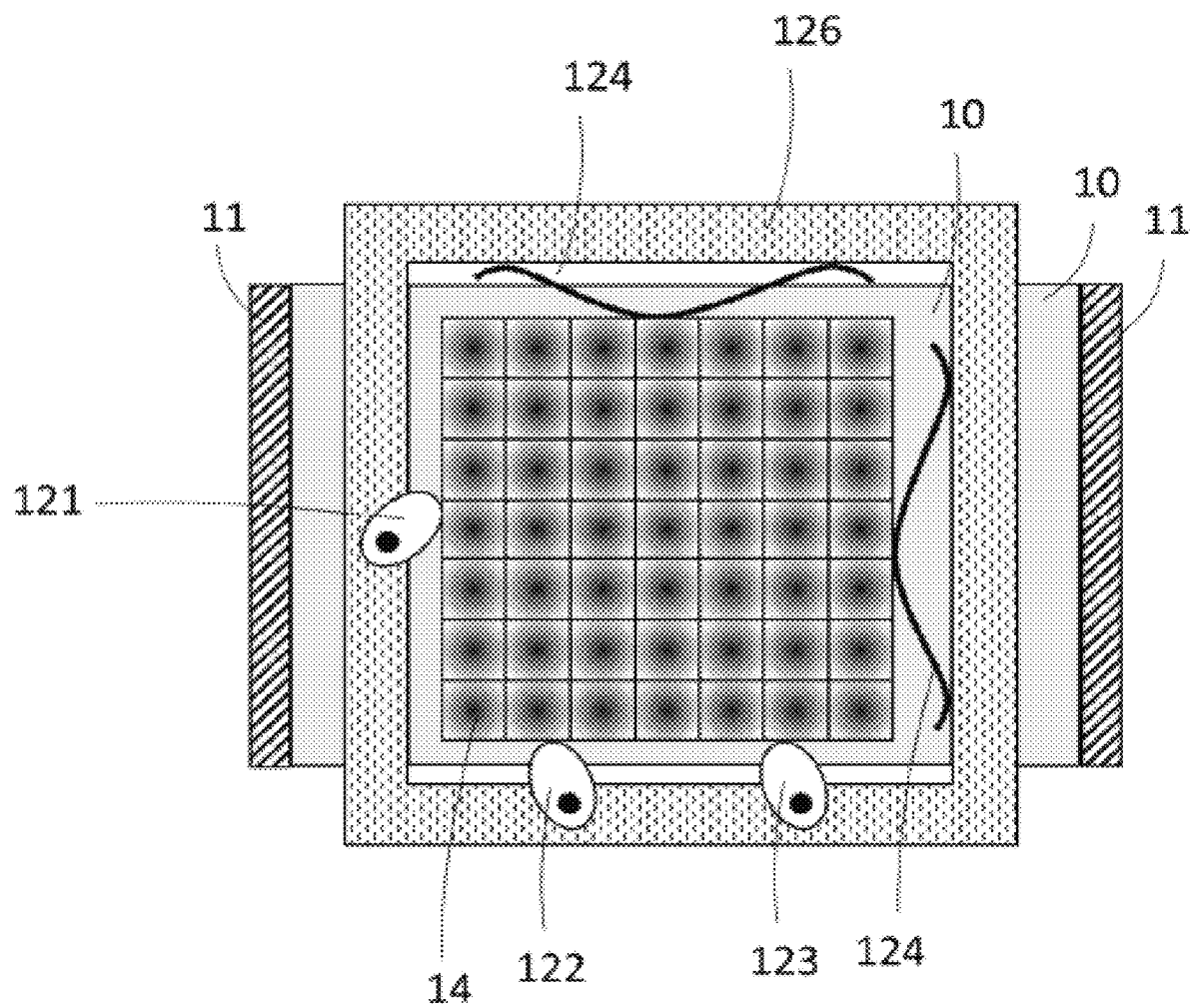
FIG. 16 provides a top-view of an adjustable luminaire with cam-driven adjustment of output beam steering and spread.

FIG. 16 shows a top view of another mechanical configuration permitting adjustment of the relative orientation of the lightguide and the focusing element array. A reflector array 14 is in contact with three cams (121, 122, and 123) mounted to stationary frame 126. The reflector array is held against the cams by leaf springs 124. One side of the reflector array is in contact with a single cam 121. The rotational position of this cam controls translation of the array in one axis (labeled here as the "x" axis). A perpendicular side of the array is in contact with two cams 122 and 123. The "y" axis translation of the lens array is controlled by adjusting cams 122 and 123 together and is set by their average extension, while twist rotation of the lens array is controlled by adjusting cams 122 and 123 separately and is set by the difference between the extension of these two cams. The cams may be connected to knobs for manual control over beam direction and width, or connected to motors for automated control. FIG. 16 depicts the cams and leaf springs in contact with the edges of the reflector array, but they could also act on the reflector array from other locations, for example on small protrusions attached to the center of the reflector array. Such a design would provide a more compact luminaire form factor by allowing the cams and leaf springs to fit within the perimeter of the reflector array and/or light guide. Further, the leaf springs may be replaced with other mechanisms for providing restoring force, such as wound springs, compressible materials, etc. Further, we note that while FIG. 16 describes an edge-lit embodiment of this invention, it can also be realized in a direct-lit configuration by utilizing an array of light sources rather than an array of extraction features in an edge-lit lightguide.

Beam Pointing and Glare Control

The luminaire may be configured to allow beam pointing in only one axis, or in two axes by appropriately constraining translation of the focusing element array relative to the lightguide or light source array. Further, the entire luminaire may be mounted in a frame to swivel in one or two axes, to provide additional mechanisms of beam pointing. For example, a luminaire with a rectangular form factor could be designed to swivel in a frame about its long axis and to provide beam pointing in the other axis via translation of the focusing element array relative to the lightguide or light source array.

Figure 17:
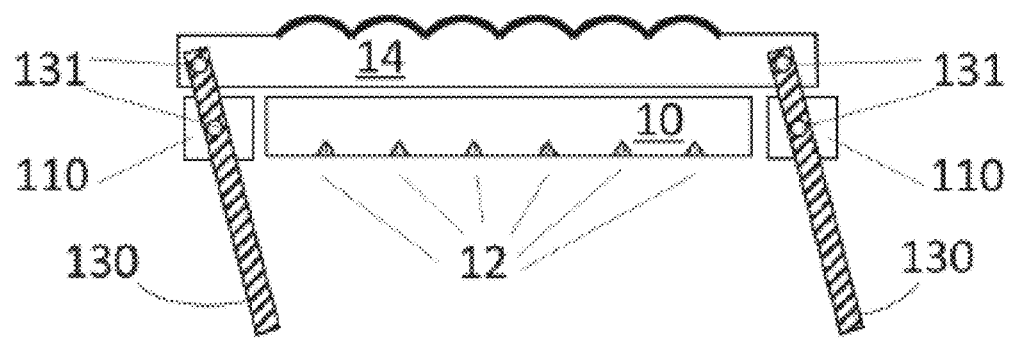
FIG. 17 provides a cross-section view of an adjustable luminaire with glare-reduction pivoting louvers.

An advantage of the inventions described herein is that the luminaires provide highly directional light with minimal glare outside of the directional beam. Nonetheless, it may be desired to shade the luminaire output to further reduce glare. FIG. 17 provides an example of a system with integrated louvers to provide such glare reduction. The louvers 130 are made of an opaque material and attached to a frame element 110 and the reflector array with pivoting connectors 131. As the reflector array 14 is translated to steer the beam, the louvers 130 automatically tilt to block light outside the steered beam. While FIG. 17 describes an edge-lit embodiment of this invention, it can also be realized in a direct-lit configuration by utilizing an array of light sources rather than an array of extraction features in an edge-lit lightguide.

Figure 18:
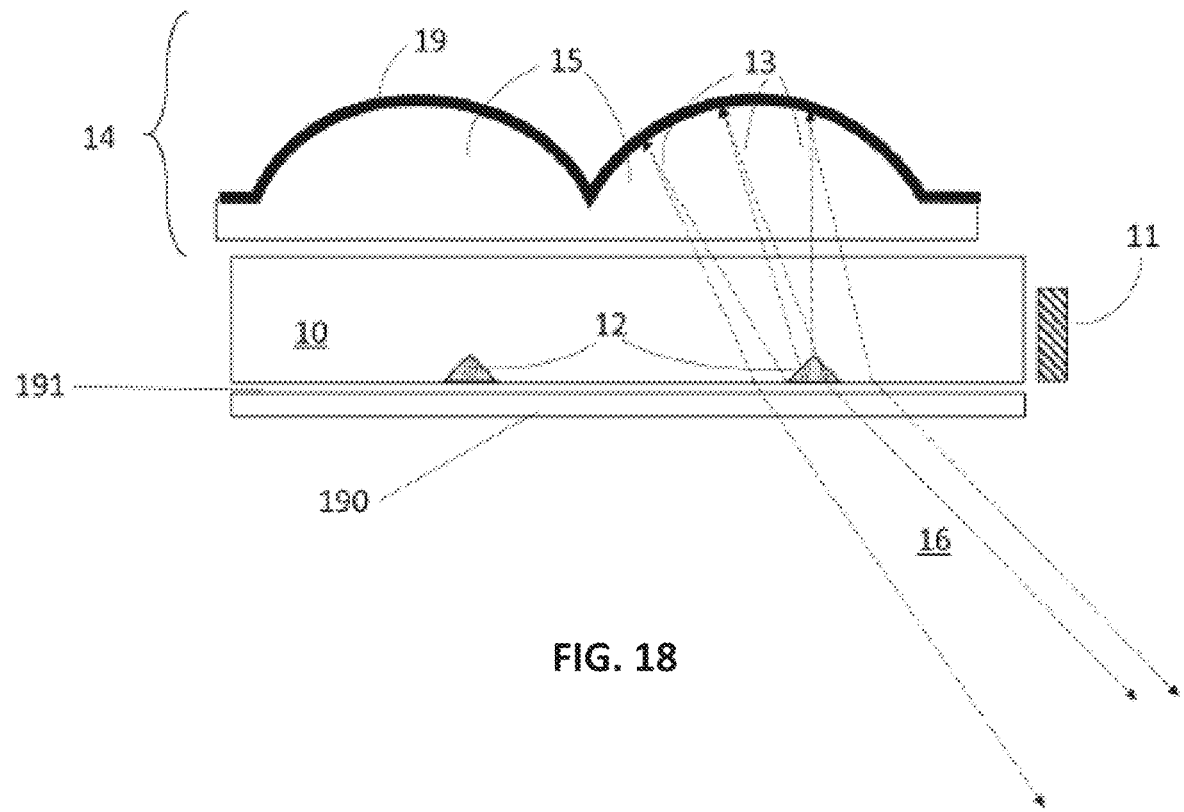
FIG. 18 provides a cross-section view of an adjustable luminaire with a protective cover layer adjacent to the light guide.

An additional invention to reduce glare and improve luminaire performance is shown in FIG. 18. A cover layer 190 is placed adjacent to the lightguide 10 on the side opposite the reflector array 14, and separated from the lightguide by a gap 191 over the majority of the area of the lightguide. The gap 191 may be filled with air and maintained by the use of a frame that holds the cover layer 190 apart from the lightguide 10, by small spacers placed between the lightguide 10 and the cover layer 190, by the natural surface roughness of the cover layer, or by any combination of these or other schemes. Alternatively, the gap may be filled by another low-refractive index material. The gap is preferably large enough to ensure total internal reflection within the lightguide 10 so that very little of the light within guided modes of the lightguide 10 enters the cover layer 190. For visible-wavelength light, the gap is preferably greater than 2 microns. For a system with reflective focusing elements (as shown in FIG. 18), the cover layer 190 is preferably made to be transparent. The function of cover layer 190 is to protect the lightguide 10 from the accumulation of dust, oil, fingerprints, and the like, which can scatter guided light and increase system glare.

Part 6: Additional Functionality

The inventions described above enable new functionality in steerable directional luminaires. They provide a capability for steerable spotlights with beam spread control that do not require external moving parts and provide a compact flat form factor. They enable multiple such steerable lights to be provided from a single luminaire and driven by a common light source. They allow adjustable spotlights to be provided in luminaires with a linear form factor of high aspect ratio. They provide for asymmetric beam profiles that can be tailored for a variety of use cases.

Additional functionality can be added to the steerable luminaires in many ways.

Figure 19:
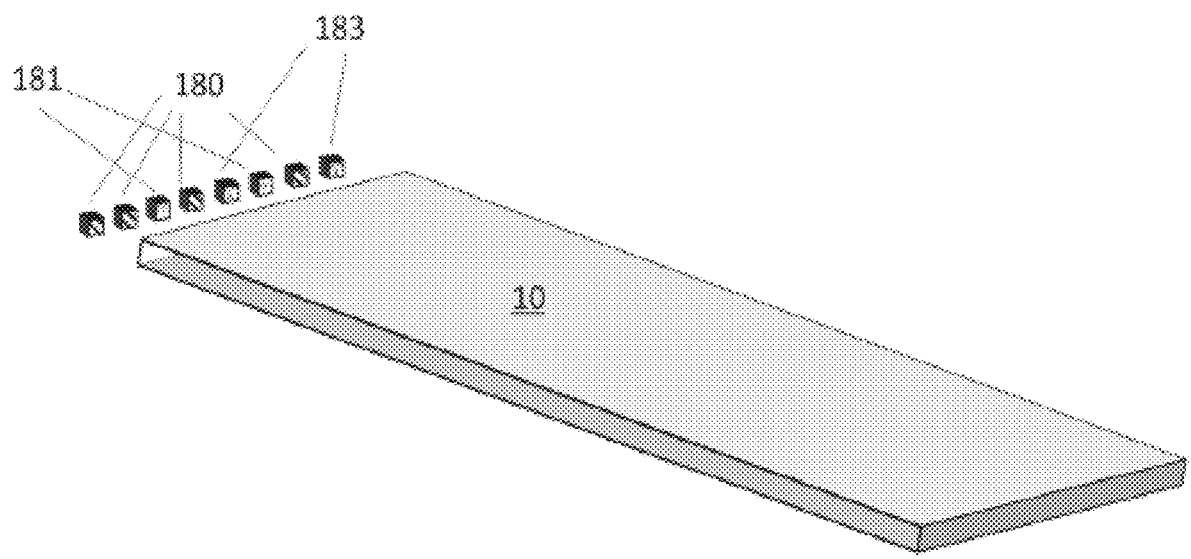
FIG. 19 provides a perspective view of an adjustable luminaire with multiple types of active elements coupled to the light guide.

In a lightguide system, multiple types of active elements may be coupled to the edge of the lightguide. For example, FIG. 19 shows a system in which three types of active elements, 180, 181, and 183, are coupled to the light guide. In one example, 180, 181, and 183 may be light sources of different spectrums—for example, LEDs of different colors or of different color temperatures. The different light source types may be connected to separate drivers so that they can be controlled independently. In this way, the output color or color temperature of the light can be varied. Another example use of such a configuration is to have one of the types of active elements be a colored light source that can be used as an indicator when adjusting the beam pointing of the luminaire, and the other active elements be white light sources used for illumination in normal luminaire use.

One or more of the active elements may also be a photosensor. These sensors measure light incident on the luminaire from different directions, with rays traveling back through the optical system to the sensors. Adjusting the direction or beam width of the luminaire thereby adjusts the direction and field of regard for the photosensors as well. This can have numerous uses. For example, with the light sources turned off, the system can be steered in a pattern to scan the area surrounding the luminaire and measure brightness in each direction. The light sources can then be turned on and beam direction and width set as needed in order to bring area illumination to a desired profile.

Another use of embedded photosensors is for optical communications. Infrared (or other wavelength) sensors and/or emitters can be integrated in the luminaire and used for directional optical communications.

While FIG. 19 describes an edge-lit embodiment of this invention, it can also be realized in a direct-lit configuration by distributing the various active element types in the array of light sources rather than placing them on the edge of a light guide that contains an array of extraction features.

Part 7: System Implementations

Figure 20:
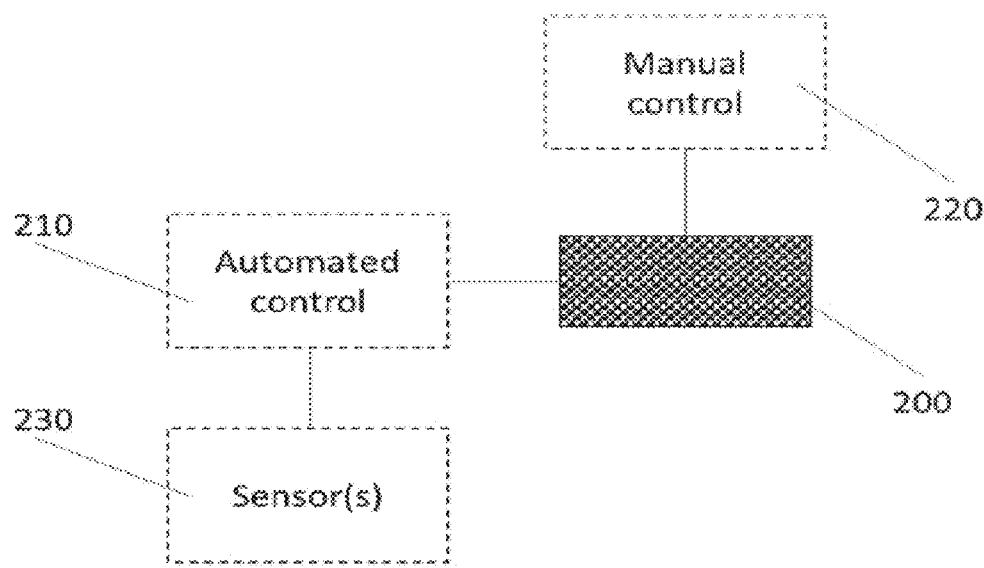
FIG. 20 provides a schematic view of an adjustable illumination system including an adjustable luminaire as well as optional manual and automated control systems and sensor inputs.

A wide range of system implementations are possible for the devices described above. FIG. 20 shows a general schematic of such a system. A steerable luminaire 200 may be connected to a manual control system 220 and an automated control system 210, which may itself be connected to a sensing system 230. The manual control system allows for dynamic control of illumination effects by an operator, and the automated control system provides for programmed variations in illumination effects and/or dynamic control of illumination effects in response to sensor inputs. Some specific design options are described below; we note that the list is far from exhaustive.

7a: Designs Optimized for Use on Moving Platforms

Figure 21:
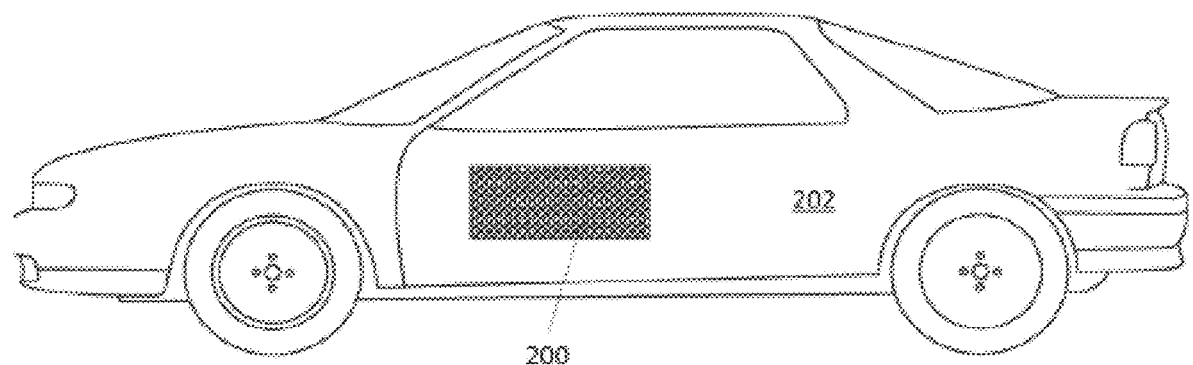
FIG. 21 provides a view of an adjustable luminaire mounted into the panel of a car.

The adjustable illumination provided by this device is of great value on moving platforms. In one embodiment, luminaires are mounted on the exterior of vehicles such as cars or boats. The luminaires may be used as steerable spotlight/searchlights. Unlike conventional steerable spotlights that require a gimbaled motorized mount, these luminaires are thin and flat, enabling them to be mounted into the structure of the vehicle, such as in the door panel or front grill of a car or on the exterior of a boat. For example, FIG. 21 shows a steerable luminaire 200 mounted in the door of a car 202. The system may further comprise a user interface for controlling the direction and spread of the light beam (for example, a pointing joystick) and a microcontroller that controls the luminaire output.

Figure 22:
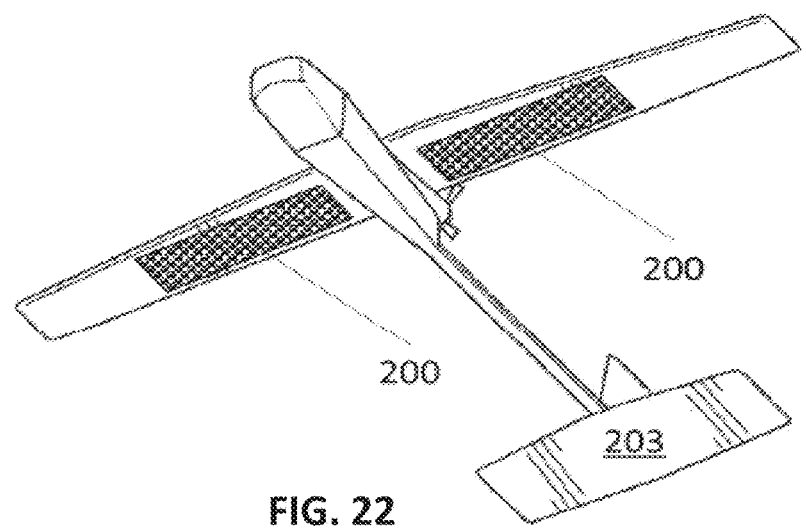
FIG. 22 provides a view of an adjustable luminaire mounted in the underside of the wing of an aerial vehicle.

In a second embodiment, steerable luminaire panels are mounted on airborne vehicles, such as on the underside of the wings of unmanned aerial vehicles. For example, FIG. 22 shows steerable luminaires 200 mounted in the wings of an aerial vehicle 203. The luminaires so mounted may be used to provide controllable illumination of the ground area beneath the vehicle. Use of infrared light sources in such a system will provide controllable infrared illumination of considerable value for night-vision systems.

In a third embodiment, the luminaires may be implemented as an emergency light and mounted on emergency vehicles. A controller can adjust the luminaire so that it provides a light beam that sweeps from side to side, drawing attention.

In a fourth embodiment, the steerable luminaire may be used to counteract motion and stabilize the pointing of a beam that is emanating from a moving platform such as a boat or truck. An active control system would include a sensor such as an accelerometer and a microcontroller that steers the luminaire to counteract movements of the platform on which the luminaire is mounted and keep the output beam targeted on a fixed location. Alternatively, a passive inertial system may be used to provide relative motion between the focusing element array and the lightguide, stabilizing the output beam.

7b: System Designs with Integrated Sensors

In one embodiment, the system performs as a voice-tracking spotlight. A steerable luminaire is integrated in a system with a microcontroller and with directional microphones as sensors. The signal from the directional microphones is processed by the microntroller to determine the position of a speaking individual and the microcontroller then aims the light beam at that individual. Such a system would provide automatic illumination of a speaker. It would be valuable as an automatic spotlight for theatrical use, and as an illumination tool for discussions in conference rooms and other gatherings.

In another embodiment, the system performs as a directional light that automatically tracks an individual. The system contains a steerable luminaire, a microcontroller, and one or more sensors used to determine the location of an individual (these can include motion sensors, a camera feed linked to image processing software, acoustic sensors, or other sensor types). Such a system can be used in many implementations. In one implementation, it forms an automatic task light that follows an individual as he or she performs tasks in various locations. This task light can reduce energy usage for lighting by selectively lighting the task areas and reducing the need for high-brightness ambient lighting. In a second implementation, it forms an automatic intruder spotlight as a component of a security or alarm system.

7c: Systems for Daylight Integration

In one embodiment, the system performs to mimic daylight, providing a natural-feeling light source. A steerable luminaire is integrated in a system with a microcontroller and is made to project a beam in a changing angle mimicking the sweep of directional sunlight. The system may further include spectral shifts over time to mimic the changing color temperature of sunlight over the course of the day and the year.

In a second embodiment, the system is made to augment natural sunlight (for example, from a window or skylight) as it sweeps across a space. The light beam from the luminaire is steered to provide "fill" illumination in areas that are insufficiently lit by the daylight beam.

In a third embodiment, the system is connected to a daylight harvesting device in order to emit daylight. This configuration requires a lightguide-system wherein the lightguide is connected to a concentrating daylight harvesting device so that the captured daylight serves as the light source input into the luminaire. The luminaire may optionally feature additional electrically-powered light sources into the luminaire.

7d: Systems with Novel Control Schemes

In one embodiment, the system is provided with one or more remote locator units featuring at least one button, switch, or other input device. The luminaire is equipped with sensors to determine the relative location of the remote locator units, for example by radio signals. The remote locator units provide a convenient lighting control system and may be installed in multiple locations. For example, in a kitchen, such remote locator units could be placed in commonly-accessed areas such as the stove, food prep area, and eating areas. Users can direct light to the area in which they are working by activating the input device on the remote locator unit in that location, and may optionally further control the beam with additional input devices on the unit. This system includes a microcontroller and a fixed sensor system to locate the position of the remote locator units (for example, this may be achieved via radio signals), as well as the luminaire. In a variation of this system, the remote locator unit can be moved around to indicate the size of the area to be lit.

In a second embodiment, a luminaire control system is designed to control multiple luminaires in a single room or space, adjusting the beams from all luminaires to achieve desired aggregate lighting profiles in the room. The control system may optionally include a camera to monitor total room lighting and adjust the luminaires as needed to provide a desired lighting profile.

Part 8: Extraction Feature Optimization for Edge-Lit Adjustable Luminaires

Figure 23A:
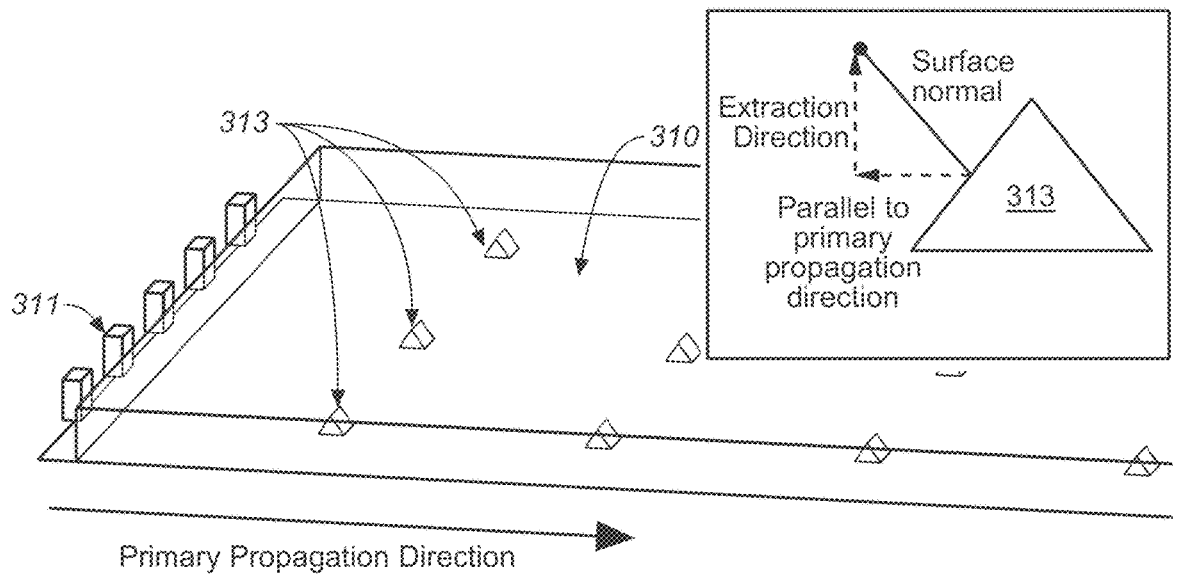
FIG. 23A shows a waveguide with a first orientation of a three-dimensional extraction feature.
Figure 23B:
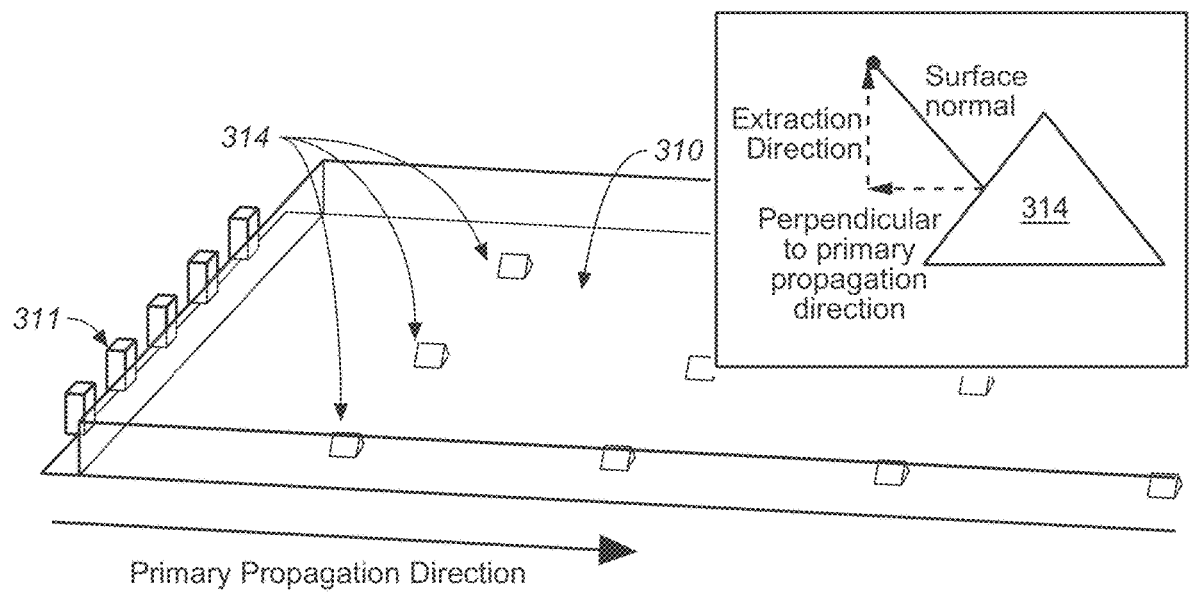
FIG. 23B shows a waveguide with a second orientation of the three-dimensional extraction feature, angled 90 degrees from the first orientation.

8a: Non-Parallel Alignment of Extraction Surface Normal to Primary Propagation Path for Greater Beam Uniformity FIG. 23 (a) shows a lightguide 310 lit by a light source 311, with extraction features 313 consisting of two 45° planes and two side planes. For this geometry, the two 45° planes are the primary extraction surfaces. FIG. 23 (a) shows the alignment of the primary extraction surfaces such that their normal vector has one component parallel to the primary direction of light propagation within the lightguide and the other component in the desired extraction direction. FIG. 23 (b) shows extraction features 314, which have identical extraction geometry but the normal surface rotated, such that one of the normal vector components is perpendicular to the primary propagation direction.

For a scattering reflective coating on the extraction surfaces, the geometry in FIG. 23 (a) results in significant shadowing of the "back" surface—the side furthest from the source. With this geometry, the front extraction feature sees significantly more energy, leading to a dual-lobed beam output with one peak significantly higher than the other. With the rotated geometry depicted in FIG. 23 (b), the beam uniformity is significantly improved.

By rotating the extraction surface so that the surface normal is perpendicular to the light propagation direction, the shadowing effect is eliminated, but the high extraction efficiency of the volumetric scattered is maintained. This effect is due to the large amount of re-scattered light present in the guide which intersects with the extraction surfaces uniformly no matter which direction it is traveling through the guide.

This invention is not limited to the extraction feature geometry shown in FIGS. 23 (a) and 23 (b). The requirement under this invention for an extraction feature to provide a uniform beam is that extraction surfaces that contribute significantly to the beam are aligned so that the surface normal vector is perpendicular to the primary propagation axis within the lightguide.

Figures 24A, 24B:
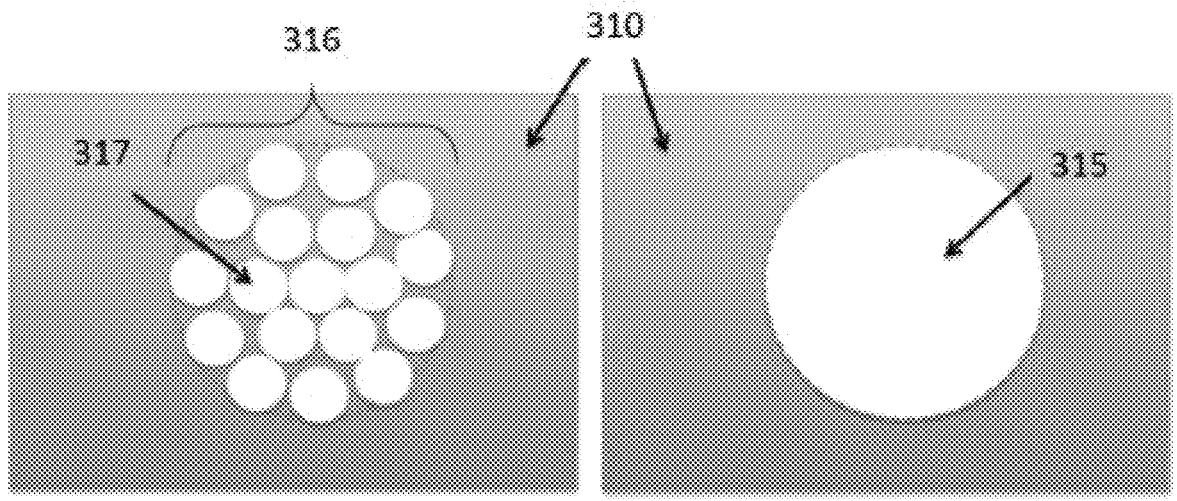
FIG. 24A shows a waveguide with a half-toned, two-dimensional extraction feature.
FIG. 24B shows a waveguide with a filled, two-dimensional extraction feature.

8b: Half-Toning and Dithering of Extraction Feature Fill for Adjustable Extraction Efficiencies FIGS. 24A and 24B show an alternative construction of extraction features. These are flat features formed by a reflective scattering material, such as white pigment, on one surface of the light guide. Such extraction features are easily formed using painting or printing techniques. FIG. 24 (b) shows a circular extraction feature 315 made of a circle of scattering material placed on the surface of the light guide. FIG. 25(a) shows an extraction feature 316 formed using a "halftone" or "dither" technique, in which the area of the extraction feature is filled with smaller areas 317 of scattering material. These may be made of dots or other shapes. The small areas of scattering material fill a portion of the overall area of the extraction feature, and that portion may be adjusted during fabrication by adjusting the pattern in order to change the total amount of light scattered by the extraction feature. One use of this technique is to compensate for the changing intensity of light propagation within the lightguide along its length, in order to maintain a more uniform output intensity along the length of the luminaire.

Figure 25:
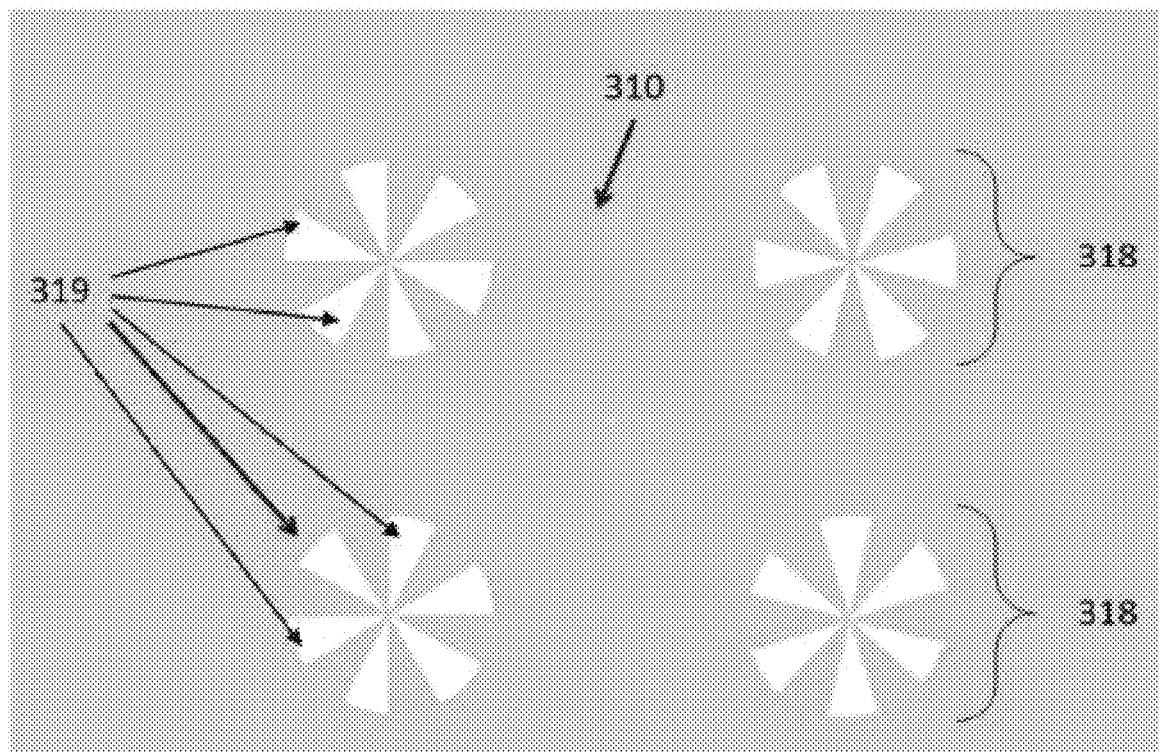
FIG. 25 shows an array of 50% filled extraction features, dithered to create a single uniform beam, similar to the output of a fully filled circular extraction feature, with 50% less energy.

FIG. 25 shows an alternative example of a dithering pattern, in which a circular extraction feature 318 is divided into wedges and a portion 319 of the wedges provided with scattering material. Clocking (rotating) or dithering the pattern amongst several extraction features in a given group, as depicted in FIG. 25, would minimize the perception of any half-toning pattern in the total output beam. Additionally, beam shaping can be achieved through this technique to add more energy to portions of the angular extent of the beam.

Part 9: Lightfield Luminaire

To properly light a given space and/or objects, a specific illumination distribution ("lightfield") is desired. Achieving this illumination distribution often requires a collection of different light fixtures and can result in significant over-lighting as the output pattern of standard commercial fixtures will not perfectly match the requirements of a given scene. Such over-lighting carries unnecessary additional cost in lighting fixtures and lamps, and results in excessive energy use. This section describes a novel luminaire design that provides for facile and low-cost customization to produce desired static illumination patterns.

Figure 26:
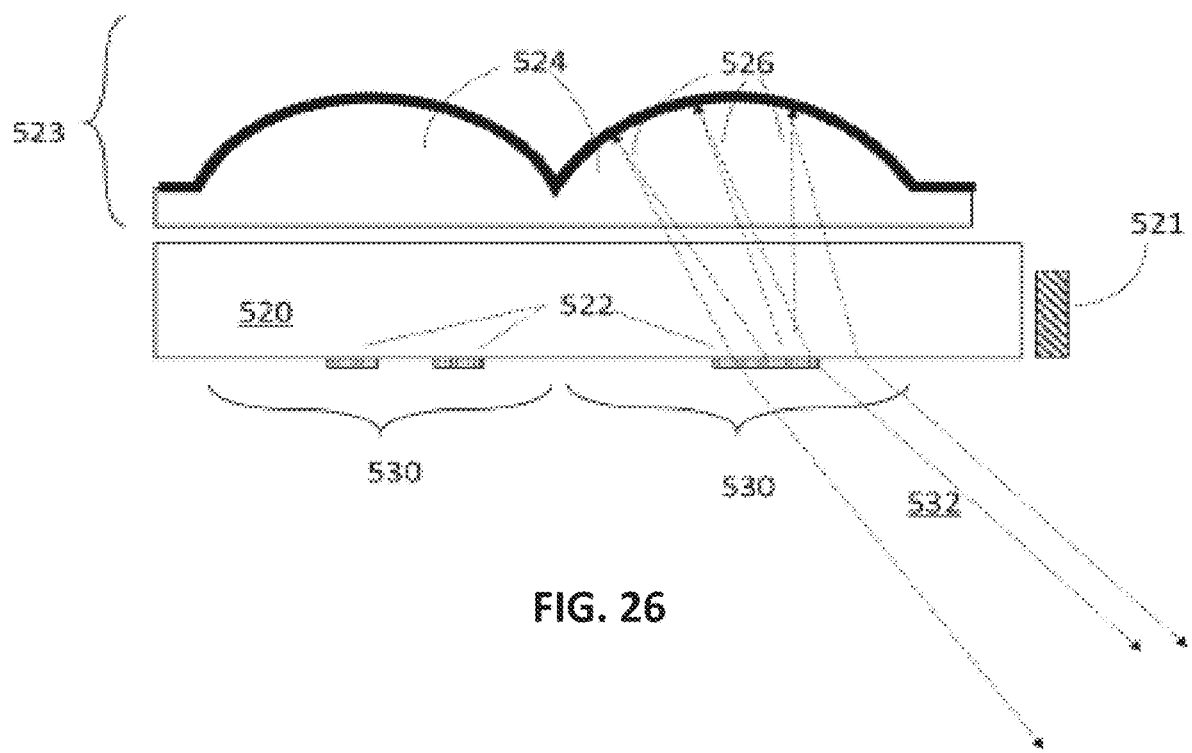
FIG. 26 provides a cross-section view of a configurable lightfield luminaire. Light rays from the light source are omitted for clarity.
Figure 27:
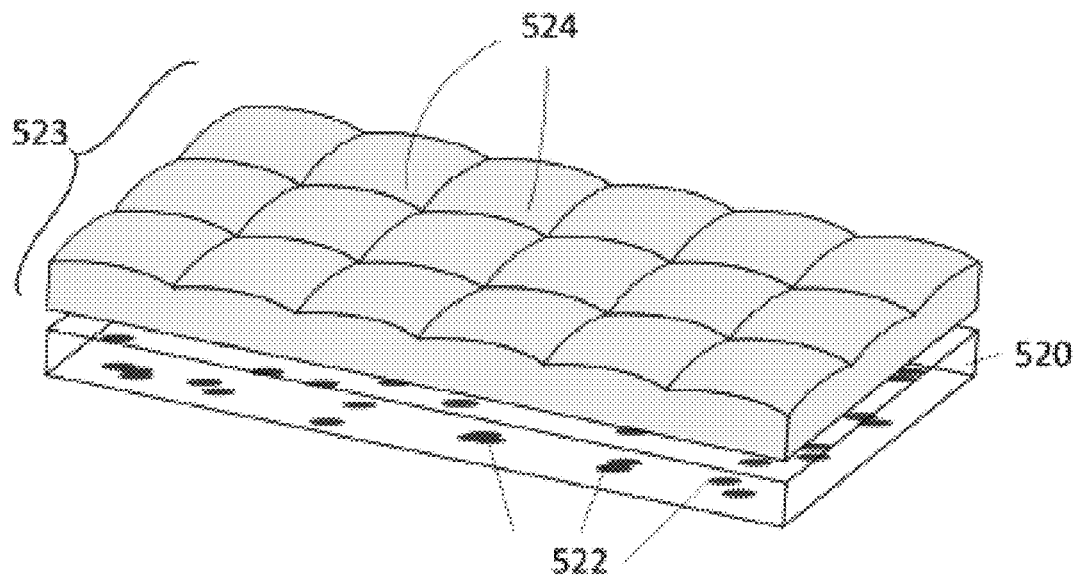
FIG. 27 provides a perspective view of a configurable lightfield luminaire. The light source is omitted for clarity.

A customized lightfield luminaire is shown in cross-section in FIG. 26 and perspective view in FIG. 27. It is comprised of a lightguide 520 that is lit by light sources 521. The lightguide 520 is formed of transparent plastic or glass. The lightguide 520 has extraction features 522 on one surface. An array 523 of focusing dielectric-filled reflectors 524 is placed on the opposite surface of the lightguide, separated by a small air gap that provides optical cladding. The extraction features 522 are located approximately at the focal plane of the reflectors 524.

The extraction features 522 are preferably formed by scattering pigment such as white paint or ink and may be produced on the surface of the lightguide 520 by any number of processes including inkjet printing, silk screening, pad printing, and similar processes.

Light rays 526 from the light sources 521 are scattered by the extraction features and a portion of them emerge from the light guide to interact with the reflectors and emerge from the luminaire as an output beam. Because the extraction features are located at the focal plane of the reflectors, rays scattering from an extraction feature at a given location will be at least partially collimated and result in a beam exiting the luminaire at a particular angle. For each reflector 524 there is an associated area 530 on the light guide. The pattern of extraction features 522 may be different in each area 530. The pattern of extraction features 522 in the area 530 is effectively projected by the reflector 524 into an output beam 532.

The area 530 may be thought of as being divided into an array of small pixels, each of which corresponds to a different output beam angle and each of which may optionally contain an extraction feature. Pixels in the center of the area 530 result in beams that exit perpendicular to the plane of the light guide, while pixels offset from the center result in beams that emerge at a corresponding angle. The total output of the luminaire is the sum of the beams produced by each reflector in the array 523. Therefore, the total light power at any given beam angle is dependent upon the number of light guide areas 530 in which the corresponding pixel contains an extraction feature.

Figure 28A:
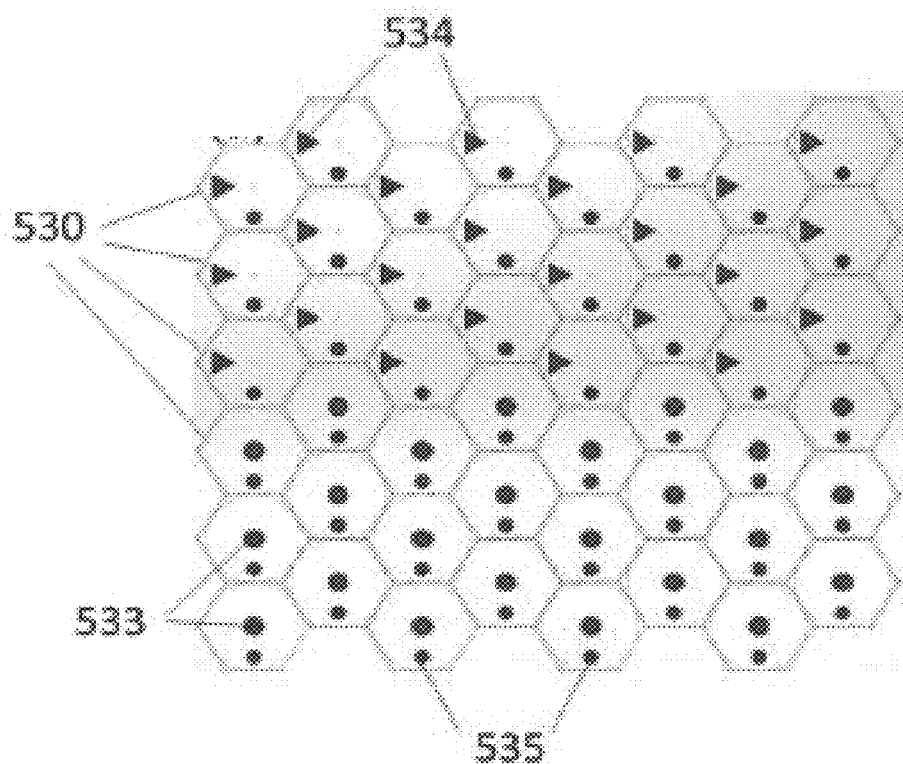
FIG. 28A is an example of a projected custom lightfield using an array of coupling features, where each hexagon corresponds to a single lens.
Figure 28B:
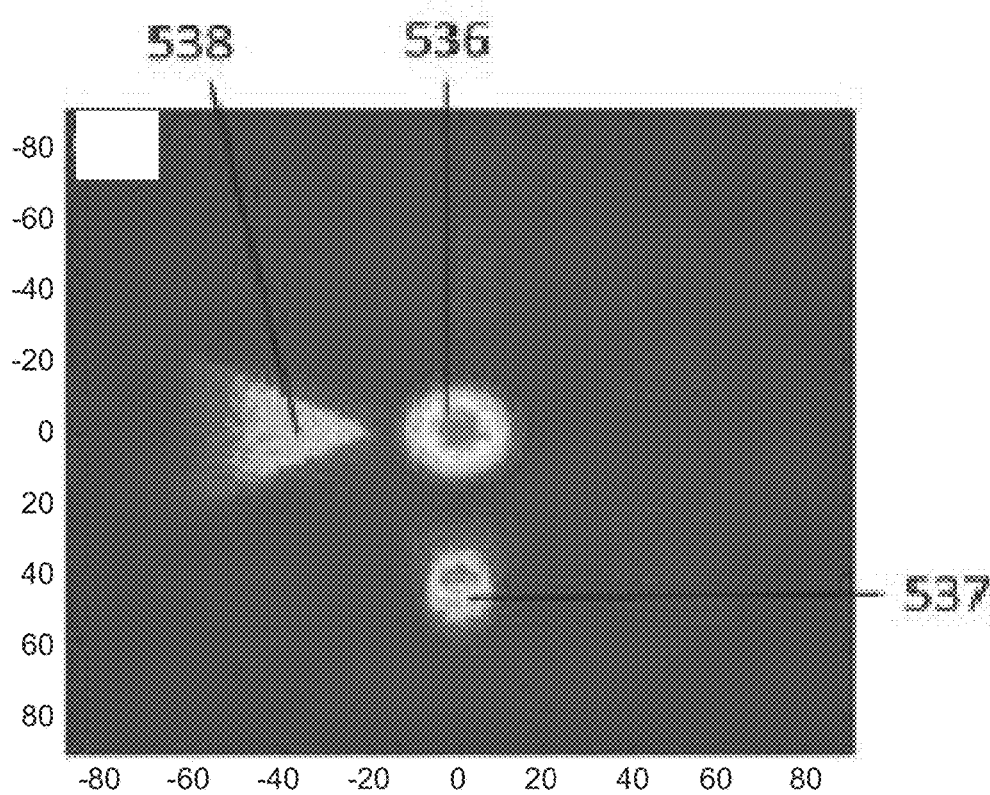
FIG. 28B illustrates the light output of the structure of FIG. 28A plotted in angle space.

An example is shown in FIG. 28 (a). An array of extraction features are placed in an array of light guide areas 530 associated with a reflector array. In this simulation, a large circular center extraction feature 533 is placed in half of the light guide areas, a triangular extraction feature 534 is in the other half, and a smaller circular extraction feature 535 is in all the light guide areas. These three extraction features combine in the projected illuminance pattern, which features a round central beam 536 resulting from the extraction features 533, a smaller high-intensity angled circular beam 537 resulting from the extraction features 535, and an angled triangular wash resulting from the extraction features 534. This illumination pattern is shown in FIG. 28 (b), which is an intensity plot of beam power vs angle.

By controlling the pattern of extraction features printed on the light guide, any arbitrary luminance pattern can be produced. Intensity at each beam angle is controlled by varying the number of light guide areas 530 in which extraction features are placed at the corresponding position.

A second method of varying beam intensity is to print the extraction features using a half-tone approach, as shown in FIGS. 24 and 25. Within a given pixel, the material of the extraction feature is printed in small dots or other shapes dithered to set the amount of extracted light. The dither may be applied with a randomized pattern so that it is not visible in the total output beam, which contains the sum of the dithering projected by multiple different reflectors. Further, the pitch of the dither may be made sufficiently small that the dithering is not evident even in the projected beam from a single reflector.

There is considerable prior art on uniform planar light guide sources (for example backlight units) that describes optimization of extraction feature density and density gradients in order to ensure uniform and high efficiency extraction of light from a light guide. The same principles can be applied to the patterned lightguide of the custom lightfield design. The pixel pattern and/or halftone in each subcell can be adjusted to ensure that the desired extraction feature density and density gradients are achieved, when analyzed on a subcell-by-subcell size scale. Optimization of the patterns may also be carried out to minimize self-shadowing of the output light by the extraction features.

A number of variations on this design are possible.

First, the reflector array 523 may be made movable rather than fixed. In this case, the position of the reflector array may be adjusted relative to the light guide. Doing so will cause the orientation of the light guide subcells and the reflectors to shift, causing the output beam pattern to be steered. This provides a mechanism for a steerable output beam of arbitrary pattern.

Second, the reflective lens array may be irregular, containing lenses of varied design. Different lenses may be optimized to project beams at different angles, permitting higher precision in achieving a given light distribution than can be achieved using a uniform lens array.

Figure 29:
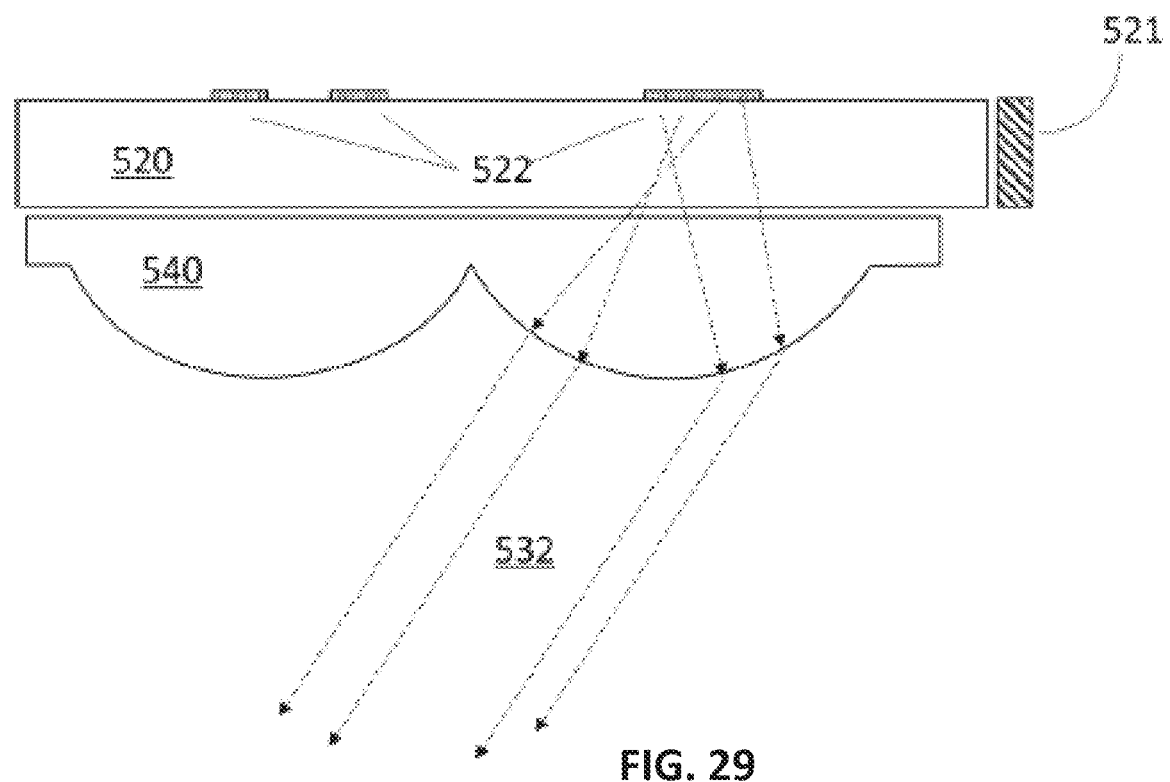
FIG. 29 provides a cross-section view of a lightfield luminaire using refractive optics.
Figure 30:
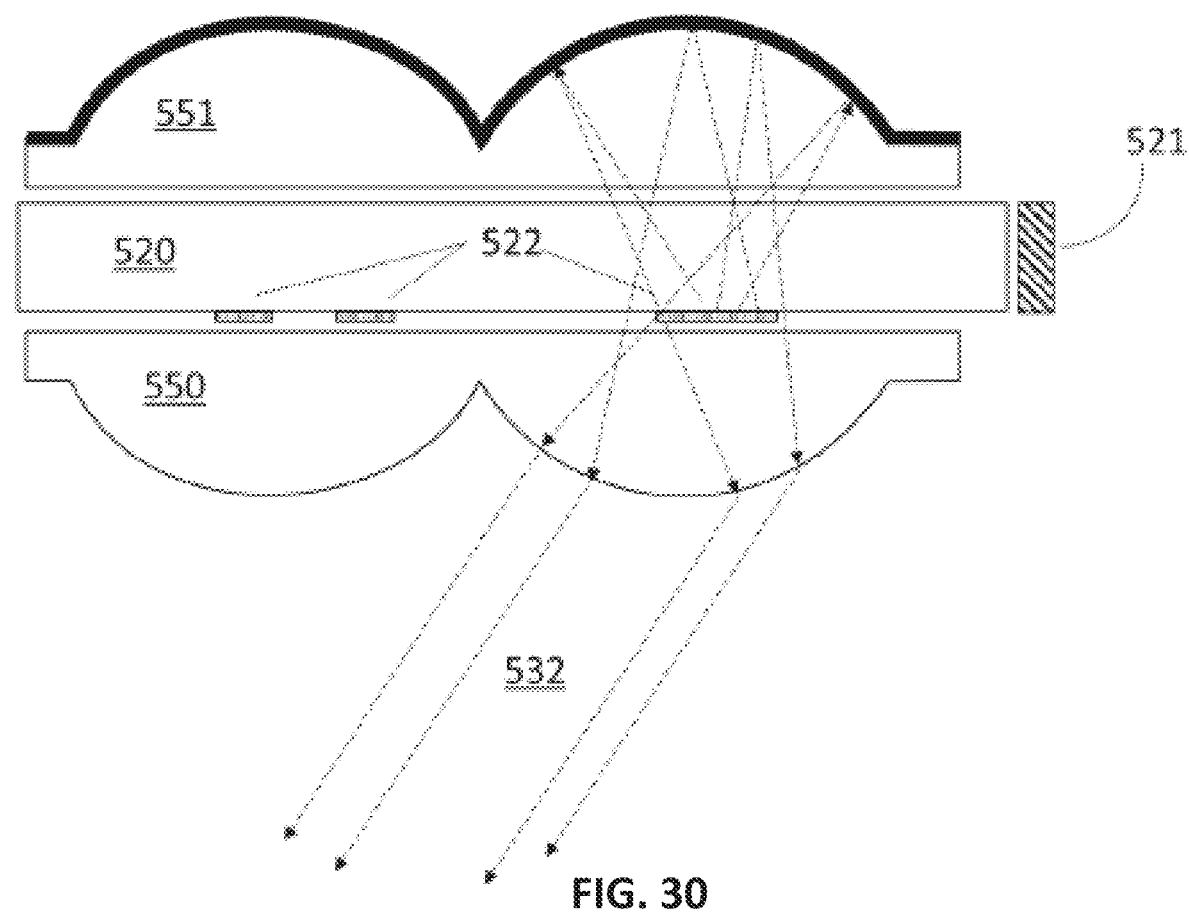
FIG. 30 provides a cross-section view of a lightfield luminaire using catadioptric optics.

Third, it is possible to utilize a refractive lens array in place of a reflective array as shown in FIG. 29. In this case, a refractive lens array 540 is placed against the lightguide 520 with a small gap for cladding. The refractive lenses will produce a different correlation between extraction feature position and output beam angle, but otherwise the design of the luminaire is very similar to the reflective array case. A further variation shown in FIG. 30 is to use matched arrays of refractive lenses 550 and reflectors 551; this is referred to as a "catadioptric" system. If properly designed, the catadioptric system maintains a flatter focal plane than a single optic system and therefore can enable finer control over the illuminance pattern.

Fourth, the extraction features may be made of colored scattering material rather than white scattering material. This will cause light of only the specific color to be directed into the output beam. A lightguide that is patterned with extraction features in a variety of colors will project that colored design. This provides a facile mechanism for producing lamps that project colored scenes, images, or logos.

Fifth, the extraction features may contain downconverting materials (such as phosphors) that change the wavelength of light as well as scatter it. A short wavelength light source can be used, with longer wavelengths produced by the downconverting material in the extraction features. Further, different downconverting material compositions may be used in different areas of the patterned lightguide in order to produce a variety of hues in the output pattern.

Sixth, the extraction features may be made non-planar. The extraction features may be formed as volume features that protrude into the lightguide.

Seventh, the luminaire may be designed so that the patterned lightguide is removable and replaceable. This allows the illumination pattern of the luminaire to be changed if desired.

Eighth, the lightguide may be made of a fixed component and a removable component, in order to facilitate changes to the illumination pattern. Extraction features are instead printed on a lightguide film which is laminated onto the fixed lightguide. The lightguide film may be attached to the fixed lightguide with an optically transparent adhesive. Alternatively, the lightguide film may be formed of a "cling" material such as vinyl that naturally adheres to the lightguide.

While particular embodiments of the present invention have been shown and described, it will be obvious to those skilled in the art that changes and modifications may be made without departing from this invention in its broader aspects and, therefore, the appended claims are to encompass within their scope all such changes and modifications.

What is claimed is:

1. An apparatus for emitting light comprising:
   one or more light sources;
   an electrical connection and heat-spreading element connected to the light sources;
   a focusing element configured to focus light emitted from the light sources to produce a beam of light that is at least partially collimated; and
   an adjuster configured to alter, over a range of positions, an in-plane position of the focusing element with respect to the light sources, where the adjuster is further configured to at least laterally translate an in-plane position of the focusing element with respect to one or more of the light sources, thereby enabling control of an overall light beam emitted by the apparatus.

2. The apparatus of claim 1 wherein the focusing element comprises a refractive lens.

3. The apparatus of claim 2 further comprising a reflective lens disposed with respect to the light sources and the refractive lens such that light emitted by the light sources first strikes the reflective lens and then transits the refractive lens.

4. The apparatus of claim 1 wherein the focusing element comprises a reflective lens having a receiving face that is illuminated by the light sources to reflect light from the light sources.

5. The apparatus of claim 4 wherein the reflective lens comprises a dielectric-filled reflective lens.

6. The apparatus of claim 4 wherein the electrical connection and heat-spreading element is configured to only partially block light reflected by the reflective lens.

7. The apparatus of claim 6 wherein the electrical connection and heat-spreading element comprises a narrow strip.

8. The apparatus of claim 1 wherein the electrical connection and heat-spreading element comprises one or more metal-core printed circuit boards.

9. The apparatus of claim 1 wherein the light sources are one or more vertical-cavity surface emitting lasers.

10. The apparatus of claim 1 wherein the light sources are one or more light emitting diodes.

11. The apparatus of claim 10 wherein the light emitting diodes have substantially flat emission faces.

12. The apparatus of claim 1 wherein the one or more light sources comprise only a single light source.

13. The apparatus of claim 1 wherein the adjuster is further configured to at least adjust a distance between the focusing element and at least one of the light sources, thereby enabling control of divergence of the overall light beam emitted by the apparatus.

14. The apparatus of claim 1, wherein the adjuster is manually- operated.

15. The apparatus of claim 1, wherein the adjuster is operated by actuators connected to a control system.

16. The apparatus of claim 1 wherein the one or more light sources comprise multiple light sources.

17. An apparatus for emitting light comprising:
one or more light sources;
an electrical connection and heat-spreading element connected to the light sources;
a focusing element configured to focus light emitted from the light sources to produce a beam of light that is at least partially collimated; and
an adjuster configured to alter, over a range of positions, an in-plane position of the focusing element with respect to the light sources, thereby enabling control of an overall light beam emitted by the apparatus;
wherein the focusing element comprises a reflective lens having a light receiving face that is illuminated by the light sources to reflect light from the light sources,
and further wherein:
the electrical connection and heat-spreading element is configured to only partially block light reflected by the face of the reflective lens,
the light sources are light emitting diodes, and
the adjuster is further configured to at least laterally translate the focusing element with respect to the light sources, thereby enabling control of a direction of an overall light emitted by the apparatus.

\* \* \* \* \*